(12) United States Patent
Levillain et al.

(10) Patent No.: US 8,316,144 B2
(45) Date of Patent: *Nov. 20, 2012

(54) POLICY RULE MANAGEMENT FOR QOS PROVISIONING

(75) Inventors: Phillippe Levillain, Agoura Hills, CA (US); Raymond Hanson, Thousand Oaks, CA (US); Lawrence Helmerich, Sylmar, CA (US)

(73) Assignee: Alcatel Lucent, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/044,249

(22) Filed: Mar. 9, 2011

(65) Prior Publication Data

US 2011/0158092 A1   Jun. 30, 2011

Related U.S. Application Data

(60) Continuation of application No. 11/304,375, filed on Dec. 15, 2005, now Pat. No. 7,930,376, and a division of application No. 10/289,698, filed on Nov. 6, 2002, now abandoned.

(60) Provisional application No. 60/336,906, filed on Nov. 7, 2001.

(51) Int. Cl.
  *G06F 15/16* (2006.01)

(52) U.S. Cl. ............ 709/230; 709/220; 709/224
(58) Field of Classification Search ............ 709/222, 709/230, 224, 221, 220
  See application file for complete search history.

(56) References Cited

U.S. PATENT DOCUMENTS

| | | | |
|---|---|---|---|
| 5,774,667 A | 6/1998 | Garvey et al. | |
| 5,819,042 A * | 10/1998 | Hansen | 709/222 |
| 6,502,131 B1 | 12/2002 | Vaid et al. | |
| 6,771,673 B1 * | 8/2004 | Baum et al. | 370/535 |
| 7,467,192 B1 * | 12/2008 | Lemler et al. | 709/223 |
| 2003/0074429 A1 * | 4/2003 | Gieseke et al. | 709/221 |

* cited by examiner

*Primary Examiner* — Wing F. Chan
*Assistant Examiner* — Andrew Woo
(74) *Attorney, Agent, or Firm* — Capitol Patent & Trademark Law Firm, PLLC

(57) ABSTRACT

Described herein is a policy-based Internet Protocol (IP) network wherein the Quality of Service (QoS) provisioning across various network devices is managed by policy processing via a user interface including a graphic user interface. The user interface incorporates information made available by a server, such as lightweight directory access protocol (LDAP) server, having a repository, and thereby allows for a consistent set up voice-over IP devices, video devices and network data devices with minimal entries by the user. Further, the user interfaces allows for efficient policy creation and editing.

1 Claim, 28 Drawing Sheets

POLICY RULE MANAGEMENT FOR QOS PROVISIONING

CROSS REFERENCE TO RELATED APPLICATIONS

This application is a continuation of, and claims priority from, application Ser. No. 11/304,375 filed Dec. 15, 2005 now U.S. Pat. No. 7,930,376, which is a divisional of application Ser. No. 10/289,698 filed Nov. 6, 2002 now abandoned, both of which claim the benefit of priority from U.S. Provisional Patent Application No. 60/336,906 filed on Nov. 7, 2001. This application incorporates by reference herein in their entireties the disclosures of (including all appendices and attached documents) application Ser. No. 11/304,375, application Ser. No. 10/289,698 and U.S. Provisional Patent Application No. 60/336,906 as if such disclosures had been set forth in full herein.

RESERVATION OF COPYRIGHT

The disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

FIELD OF THE INVENTION

This invention pertains generally to policy-based networks and particularly to policy-based networks having user interfaces for efficient provisioning of quality of service for network devices.

BACKGROUND

Network priority is a means of network bandwidth management for data, video and voice traffic and is implemented with administrator-defined policies. This kind of management is termed Quality of Service (QoS) and is controlled using policy-based network processes. In policy-based networking for an Internet Protocol (IP)-based network, a policy refers to a formal set of statements that define the manner of resource allocation among its clients. In policy-based networking, the administrator uses policy statements in order to define a particular level of priority for each of the kinds of services according to parameters including time schedules and according to devices defined by parts or subnets of the network.

Typically, an administrator establishes the provisioning of the QoS of network policies on an ad hoc basis. This approach requires a great deal of administrative effort, particularly where provisioning for voice-over-IP (VoIP) devices, video devices, or critical servers is required. Further, this approach can yield undesired performance in the resulting network due to inconsistencies in the user set up.

SUMMARY

Described herein is a policy-based IP network including a plurality of network devices, each having a directory, the plurality of network devices being operatively connected to a plurality of switches via a local area network with each of the plurality of switches supporting QoS and policy files for its respective supported network devices; a network device discovery server for retrieving directory information of each of the plurality of network devices from a supportive respective switch, the network device discovery server communicating with the switches via a network backbone; a server, such as a lightweight directory access protocol (LDAP) server, having a repository for policy data and for receiving policy updates; a trap server for receiving at least one device policy table update notice from at least one of the plurality of network devices; and a network policy server having processing for provisioning QoS via a user interface, wherein the user interface provides a graphic user interface for a user to rapidly set up the network devices. Further disclosed is a method of quality of service provisioning in a policy-based IP network including the steps of: specifying a priority to provision QoS for voice-over IP network devices via a graphic user interface to policy processing; specifying a priority to provision quality of service for video and data processing network devices via the graphic user interface to policy processing; and defining and implementing network policies for provisioning quality of service via the graphic user interface to policy processing.

BRIEF DESCRIPTION OF THE DRAWINGS

The present invention is illustrated by way of example and not limitation in the figures of the accompanying drawings, and in which.

DETAILED DESCRIPTION OF THE INVENTION

The several embodiments of the present invention provide a method and a network for provisioning policies so that all voice and data QoS in a policy-based IP network may be prioritized at the highest quality of service over a user-specified range of devices with minimal user interaction. Through a graphic user interface, device selection is presented to the user or network administrator with the presentation separated according to devices, i.e., voice devices versus other networking devices and servers whose applications may require a high QoS priority.

In the several embodiments of the present invention, a policy rule, or policy, is a logical device entity comprising at least one policy condition and a policy action, used for purposes of controlling bandwidth usage by switch processing features such as quality of service. If the policy condition evaluates "TRUE," then the device performs the policy action. Generally, in order for a policy rule to be evaluated by the device, the policy must belong to a policy group. For some device operation systems, there may be an additional level, policy service, to which a policy group belongs.

Figure 1:
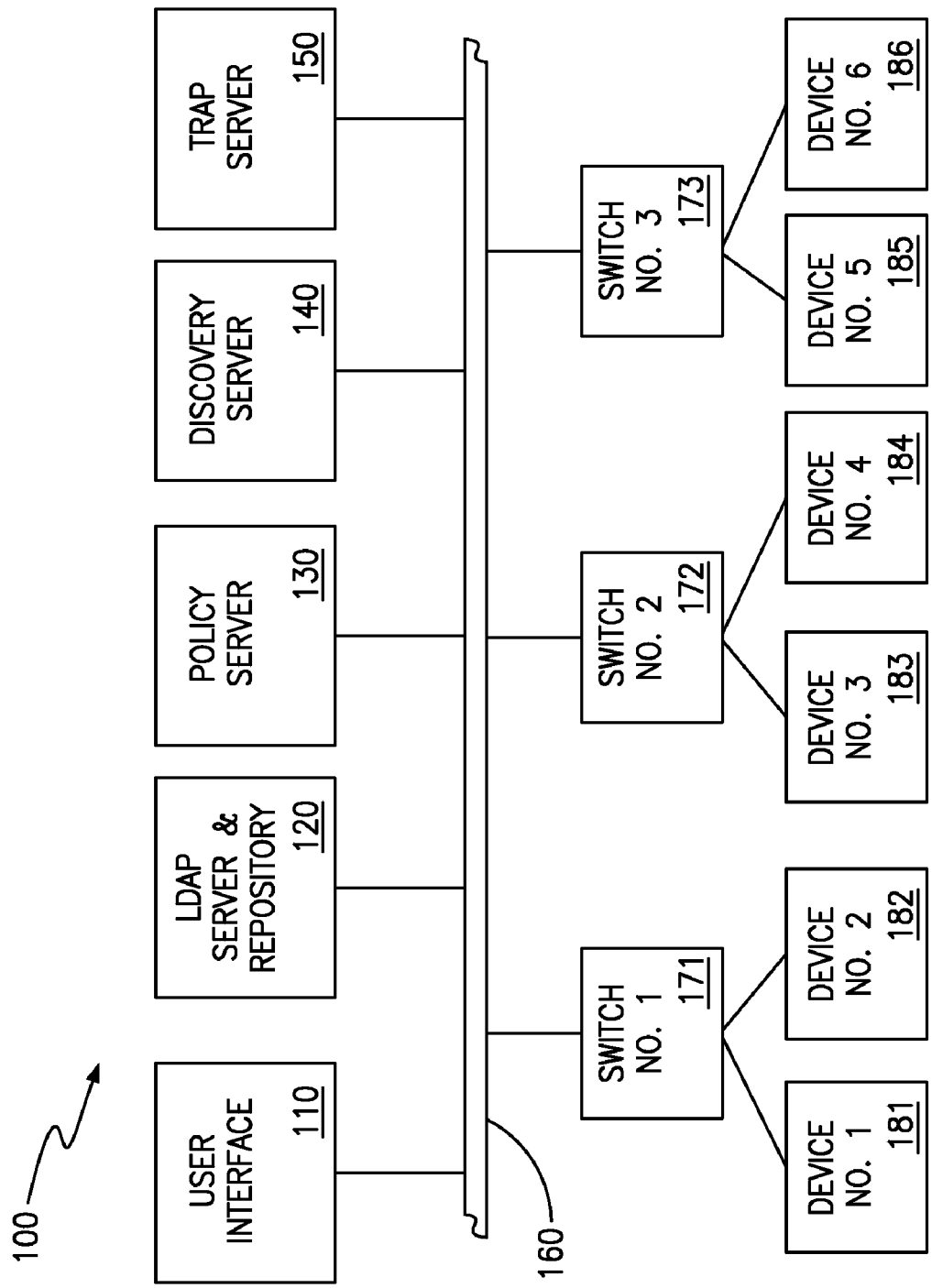
FIG. 1 is an example network architecture for embodiments of the present invention.

FIG. 1 illustrates a policy-based IP network 100 including a user interface 110, a policy server 130, a Lightweight Directory Access Protocol (LDAP) server having a repository 120, a device discovery server 140, a trap server 150, with the servers in communication via a network backbone 160 with a plurality of switches 171-173 and a plurality of devices 181-186.

Figure 2:
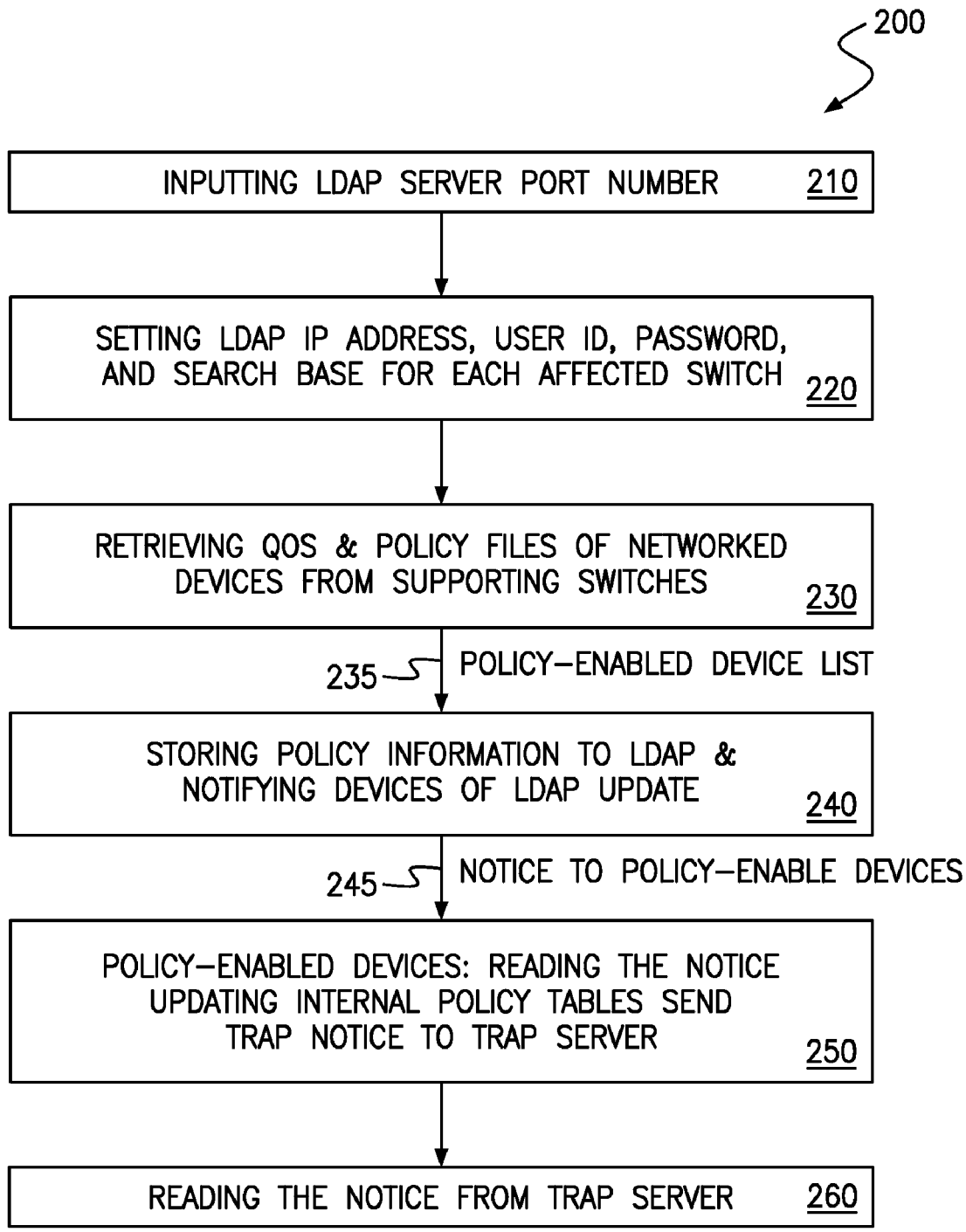
FIG. 2 is an initial set up process flowchart for embodiments of the present invention.
Figure 3:
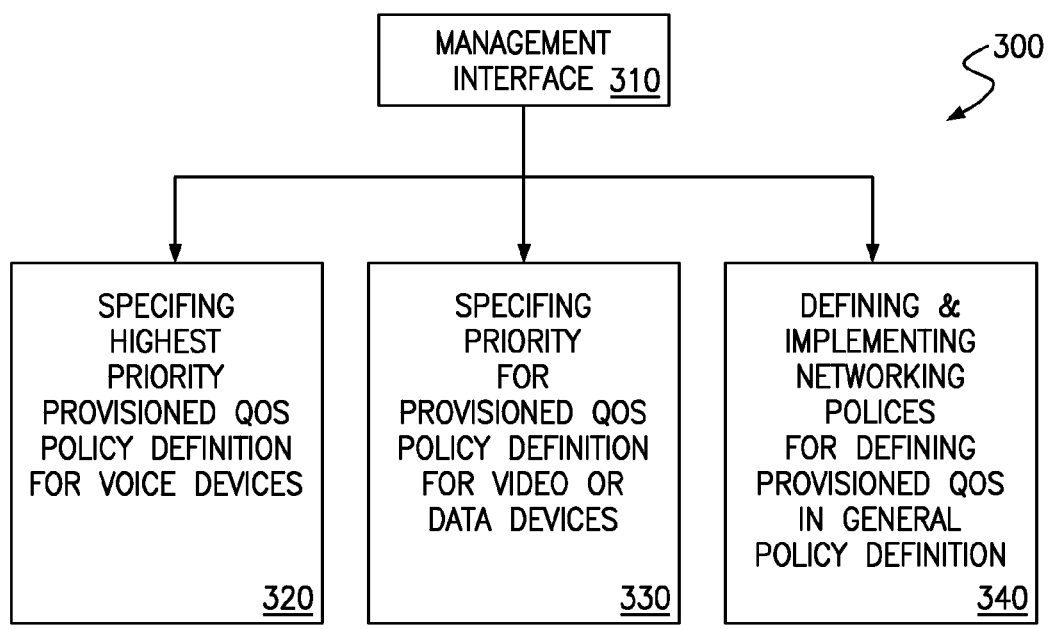
FIG. 3 is a block diagram of example modes of the management interface embodiments of the present invention.

The process flowchart of FIG. 2 illustrates that during installation of the policy processing, the administrator inputs the LDAP server port number 210. Preferably, this is the only LDAP server parameter over which user direct control is allowed. Thereafter, the policy processing of the policy server 130 sets the LDAP IP address, User ID, Password, and Search Base for each switch to which it writes 220. In addition to those LDAP objects and attributes used by the switch for policy management and other features, the LDAP repository is also used by the policy processing to store the mapping between policy rules and their targets.

Several embodiments of the present invention use a discovery service 140 for ping sweep discovery of networked devices, whereupon the devices are then queried 230 by the discovery service 140 through Simple Network Management Protocol (SNMP) for their flash file directory contents. Enhanced discovery service embodiments investigate switches for policy-supporting files, for example, policy.img and qos.img files on flash memory in supported switches to determine if devices are capable of supporting policies. The discovery service flags policy-enabled devices, and provides a list of such devices 235 to the policy processing. The policy processing subscribes to the discover service events to receive updates to the policy-enabled device lists. In addition, the discovery service uses SNMP to discover virtual local area networks (VLAN) groups, which may be used for the defining of policy conditions. Where devices are capable, the devices may identify VLAN groups as being voice-capable, allowing easier identification of voice devices for ready QoS provisioning by the policy processing.

The policy processing writes 240 policy information to the LDAP repository 120 and notifies the devices 240 against which the policies must be applied, as identified by the network administrator through the policy processing interface, that the LDAP server has been updated. This action works to ensure that each applicable network device is notified and thereby prompted to read the repository 120 discern applicable policy changes. When policy-enabled devices receive the notice 245 that the LDAP repository of policy data has been updated, the policy-enabled devices each generate a trap notification 250 signifying that they have each read the repository changes and that their internal policy tables have been updated. The policy processing uses a trap server service to subscribes to device trap events. In several embodiments of the present invention, the trap server uses SNMP to achieve trap notification. The policy processing will enhance trap notification by reading each device's policy rules table 260 (from the appropriate policy processing management information bases, or MIBs, where an MIB is a formal description of a set of network objects that can be managed using SNMP) and confirming that there is a policy rule name that matches the rules in the LDAP repository.

The policy processing uses SNMP directly to provide device notification through the serverPolicyDecision MIB object for example. In this example for a network management system (NMS), the object can be set to (0) to flush policies ("flushPolicies") or to (1) to re-cache policies ("re-cachePolicies"). The MIB description for this object is expressible as: "This object allows an NMS application to influence the policy manager's treatment of existing policy decisions that were established by the policy manager. By setting recachePolicies, an NMS can cause the policy manager to reload all its policies from the current primary LDAP server. By setting flushPolicies, all the policies are deleted by the policy manager." Policies for individual devices may be set through SNMP MIB browsers and through other interfaces for particular devices.

The Lightweight Directory Access Protocol (LDAP) server information is set and stored by the policy processing during its installation process. Depending on the switch, an SNMP MIB Browser, a graphic user interface or the device user interface is used to set the LDAP Server address.

For a given device-networking feature, Policy Rules are defined that include of Policy Conditions that must be met to allow defined Policy Actions to dictate network traffic throughput. The policy processing provides the user with a mode-based management interface 300 with graphic user interfacing through which the user manages a policy-based network 310 including:

1. A policy-based network management interface for specifying a priority level (e.g., highest priority) provisioned QoS policy definition for applicable voice devices (i.e., a process for readily setting the voice mode) 320;

2. A policy-based network management interface for specifying a priority level for provisioned QoS policy definition for video devices, including multimedia devices, and data devices serving high-priority applications (i.e., a process for readily setting the data mode or the video mode) 330; and 3. For defining and implementing networking policies for defining provisioned QoS in general (i.e., a processing assisted process for rapid set up via an expert or wizard mode) 340.

Figure 4:
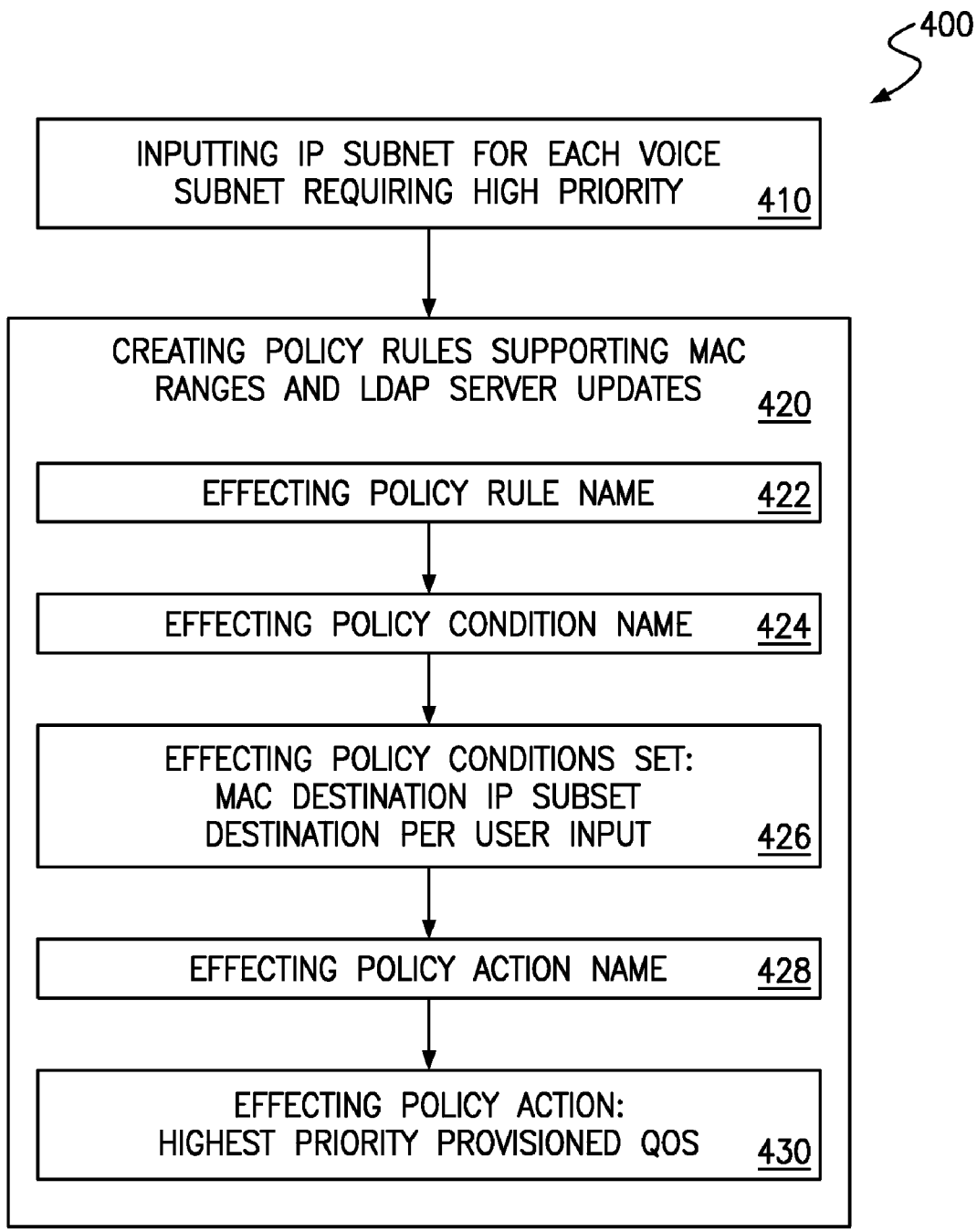
FIG. 4 is a voice over IP set up process flowchart for embodiments of the present invention.

For example, an embodiment of the present invention has a process that begins in a mode for providing highest-priority provisioned QoS to voice devices. FIG. 4 illustrates the steps of this mode 400 where the user enters the IP subnet for each voice subnet that requires a high priority 410. All policy rules and LDAP server updates necessary for administering this highest level QoS for the selected voice devices are created by the process 420 effecting: a Policy Rule Name 422; a Policy Condition Name 424; a Policy Condition Set 426 which is optionally a media access control (MAC) destination or an IP subnet destination per user input; a Policy Action Name 428; and a Policy Action 430. Where there are two or more ranges of MAC addresses that apply to the devices, two or more rules are created. An example of a user interface screen for this mode is illustrated in FIG. 5.

Figure 5A:
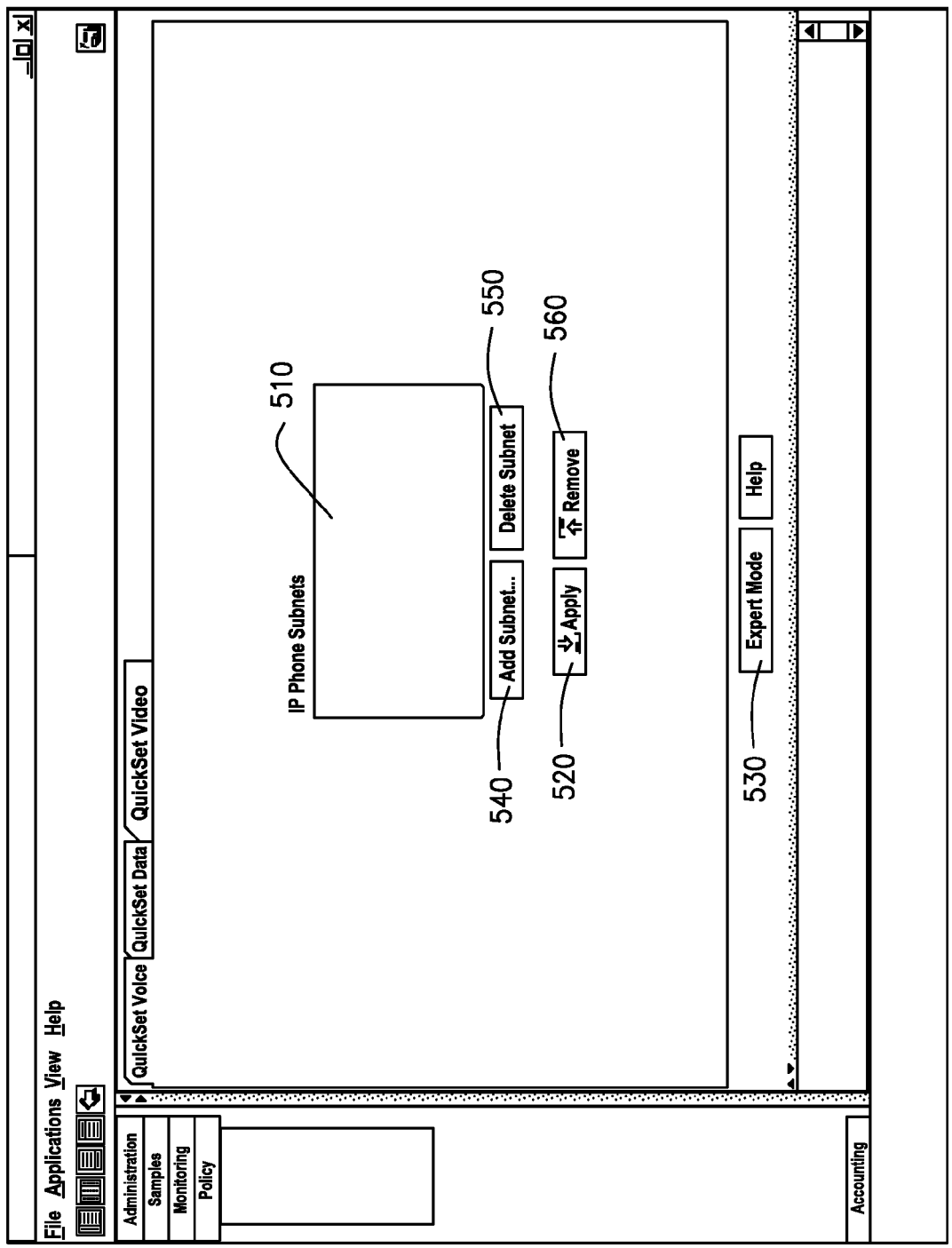
FIG. 5A is an example graphic user interface for voice over IP set up of the present invention.
Figure 5B:
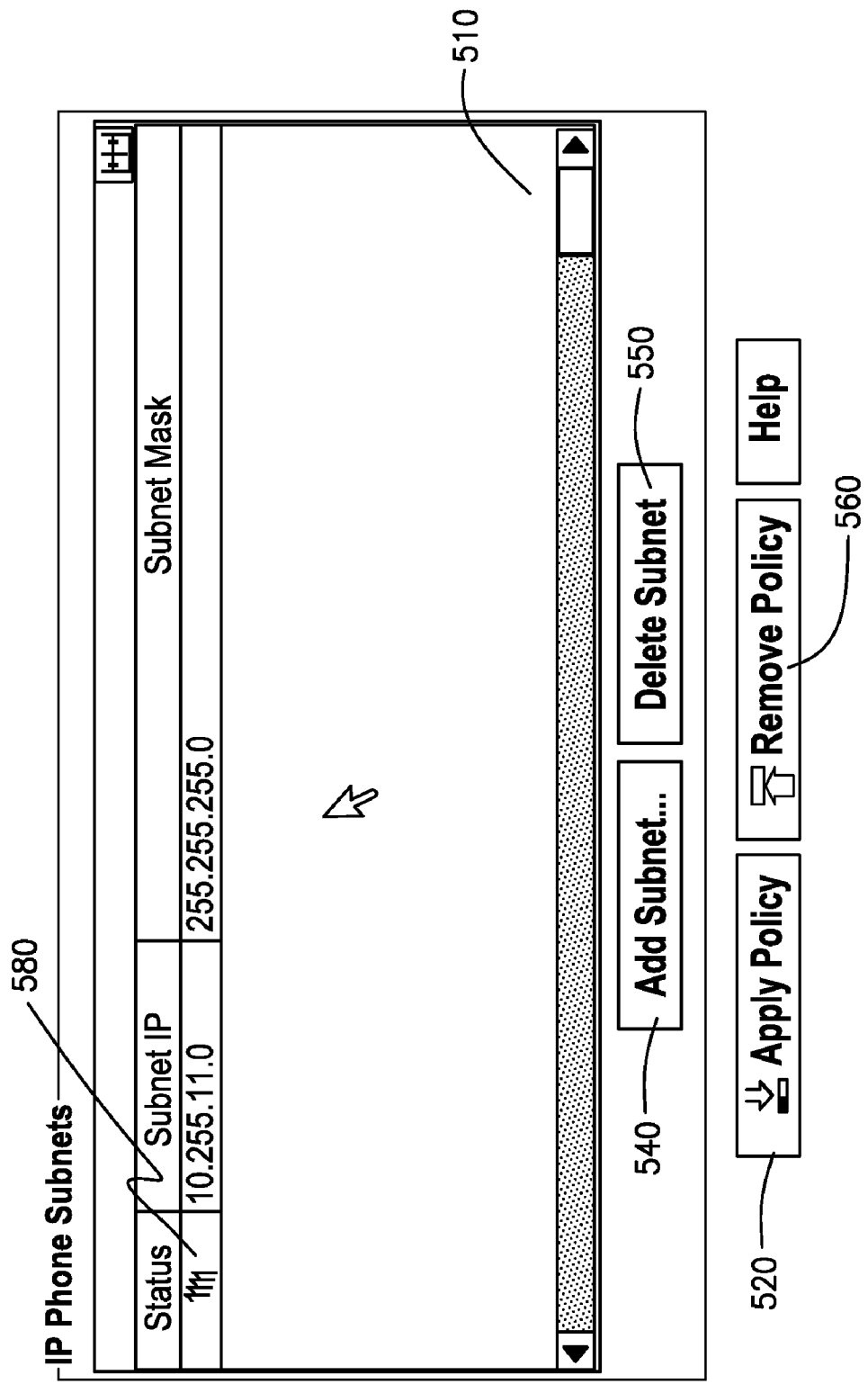
FIG. 5B is an example graphic user interface for voice over IP set up of the present invention.

In the graphic user interface example of FIG. 5, where there are four QoS priority queues supported for the devices, voice devices are allowed the highest priority, preferably being set to this priority by adding a voice-supported subnet to an "IP Phone Subnets" table 510 and then selecting the "Apply" button 520. In order to set voice devices to any other priority, the user selects the creating and editing mode by selecting the "Expert Mode" button 530. Subnets are added by selection of the "Add Subnet" button 540 and removed by selection of the "Delete Subnet" button 550. The "Remove" button 560 removes provisioned QoS from all listed subnets. When the "IP Phone Subnets" table 510 appears on the first running of the policy processing, the table 510 will be empty and the user will have to enter all the voice subnets for IP Phones manually in the event a discovery service or manager 140 does not recognize these devices. Thereafter, a preferred embodiment has the user being allowed to restore this data upon a successive interfacing session with the policy processing.

One or more status icons are used in the graphic user interfaces of the several embodiments of the present invention. In an example embodiment illustrated in FIG. 5B, an icon 580 is displayed next to the list of devices pertaining to that service for the various modes or QoS provisioning (e.g., set up of VoIP devices, set up of data devices, and policy rule creating and editing). By way of example, the color of the icons indicates the current status of the selected operation as follows: gray indicates there is currently no QoS policy in effect for the device; green indicates there is currently a QoS policy in effect for the device; yellow indicates there is currently a QoS policy add or delete operation pending write to the LDAP server; and red indicates that a policy add or delete was written to the LDAP server that the device is has not yet been reached.

Figure 6:
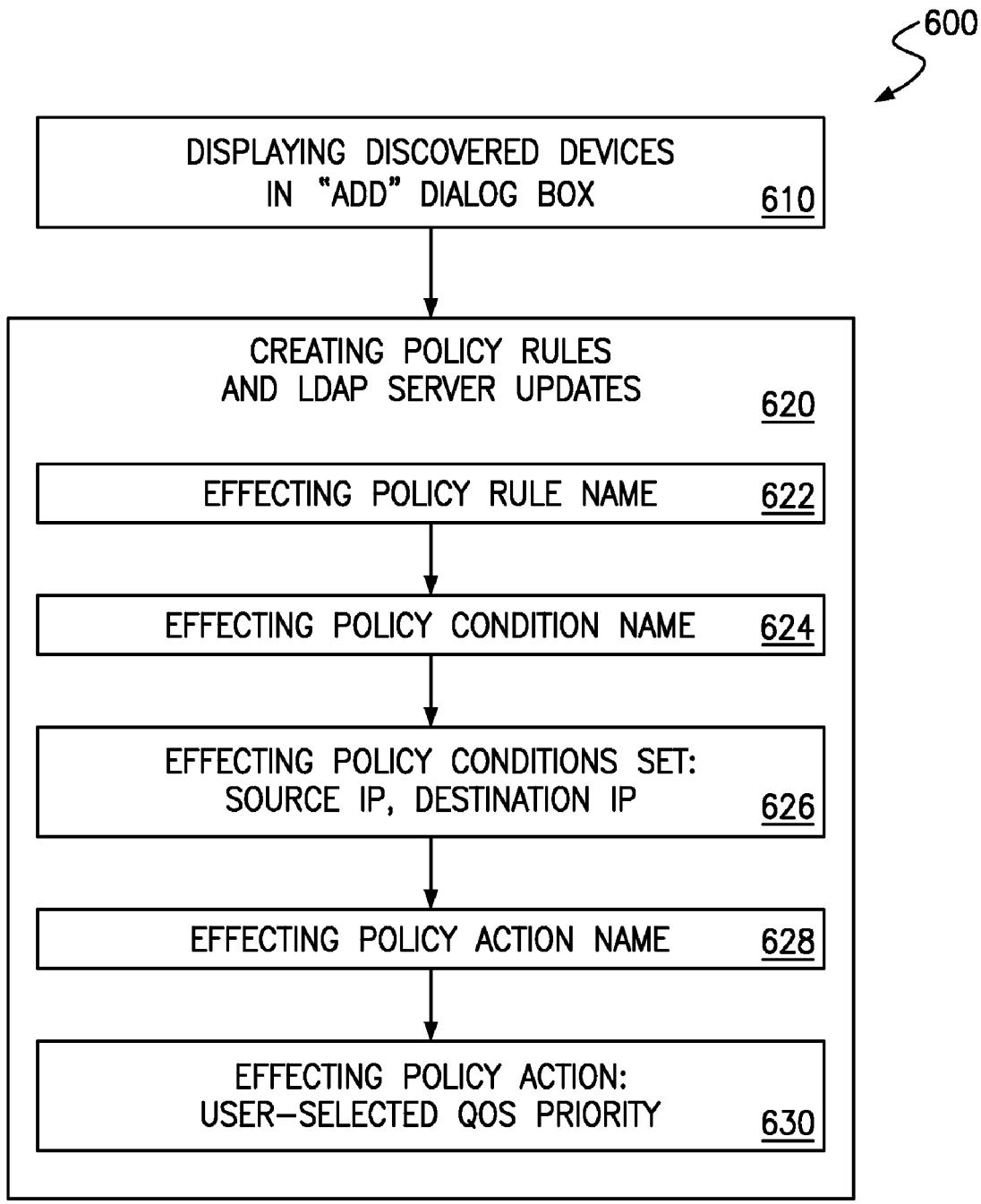
FIG. 6 is a network data device set up process flowchart for embodiments of the present invention.

In the several embodiments of the present invention, data devices, video devices, including multimedia devices, serving high-demand application servers may be set to use any of the several QoS priority queues supported for the network devices using the data mode set up process. In the present example, four QoS priority queues are supported by devices. FIG. 6 illustrates that after displaying discovered devices in an "Add" dialog box 610; all policy rules and LDAP server updates necessary for administering the selected level of QoS for the listed data devices are created by the setup process 620, for date mode setup or video mode setup, as follows: effecting policy rule name 622; effecting policy condition name 624; effecting policy conditions set 626 (Source IP, Destination IP); effecting policy action name 628; and effecting policy action 630 (User-selected QoS Priority).

Figure 7A:
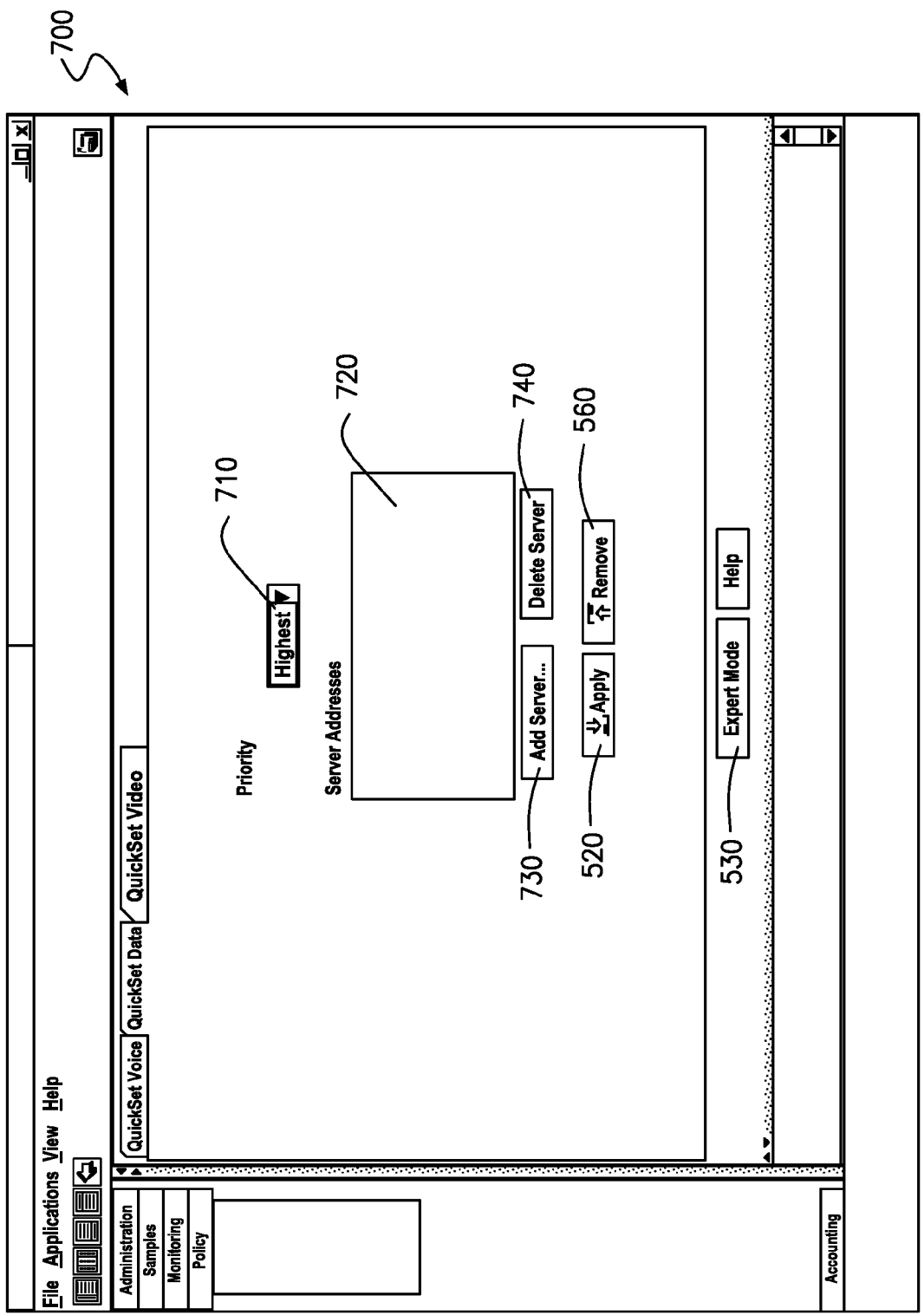
FIG. 7A is an example graphic user interface for network data device set up of the present invention.
Figure 7B:
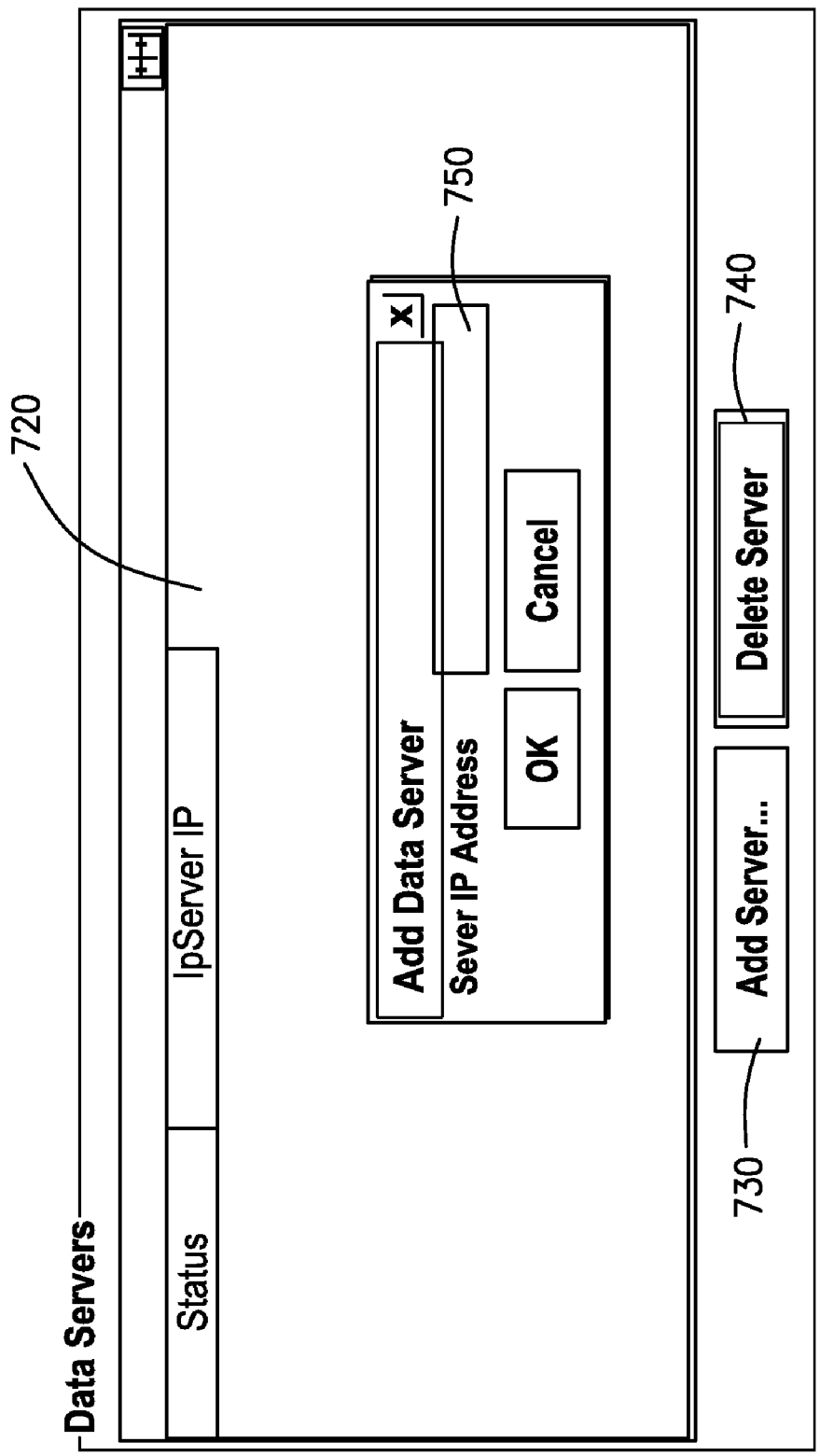
FIG. 7B is an example graphic user interface for network data device set up of the present invention.

In an example embodiment of the present invention, the user interface of the data setting mode is illustrated in FIG. 7A where only one QoS priority is allowed to be selected for all the selected devices (e.g., highest) 710 and the setting maps into firmware QoS priorities of the network devices. Alternative embodiments allow for the selection of a plurality of QoS priorities for particular devices within the network data device setting mode 330. Returning to the present example data setting mode interface 700, if a different QoS is needed for other data server sets, the "Expert Mode" button 720 is selected. In an example embodiment, the QoS priority will be set for the source IP address only, which allows for high priority traffic from the user-defined servers; allotting high priority to the servers is not required in this embodiment. For ease of administration, the data mode displays the discovered devices (FIG. 7B) in the "Add" dialog box 750.

Data server IP addresses are added by selection of the "Add" button 730 and removed by selection of the "Delete" button 740. When the "Server Addresses" table 720 appears on the first execution of the policy processing, the table 720 will be empty and the user will have to enter all the data server IP addresses using the discovered devices in the "Add" dialog box 750. Thereafter, the policy processing will allow the user to restore this data upon the next invocation of the policy processing and by using the policy processing graphic user interface.

Discovered devices that are not configured using the above voice and data set up modes will remain at the default (i.e., best effort) QoS, unless they are alternatively prioritized using some other means. In several embodiments of the present invention, the policy processing using the above voice and data set up processes provides for a majority of the cases for which policy creation is typically necessary.

Figure 7C:
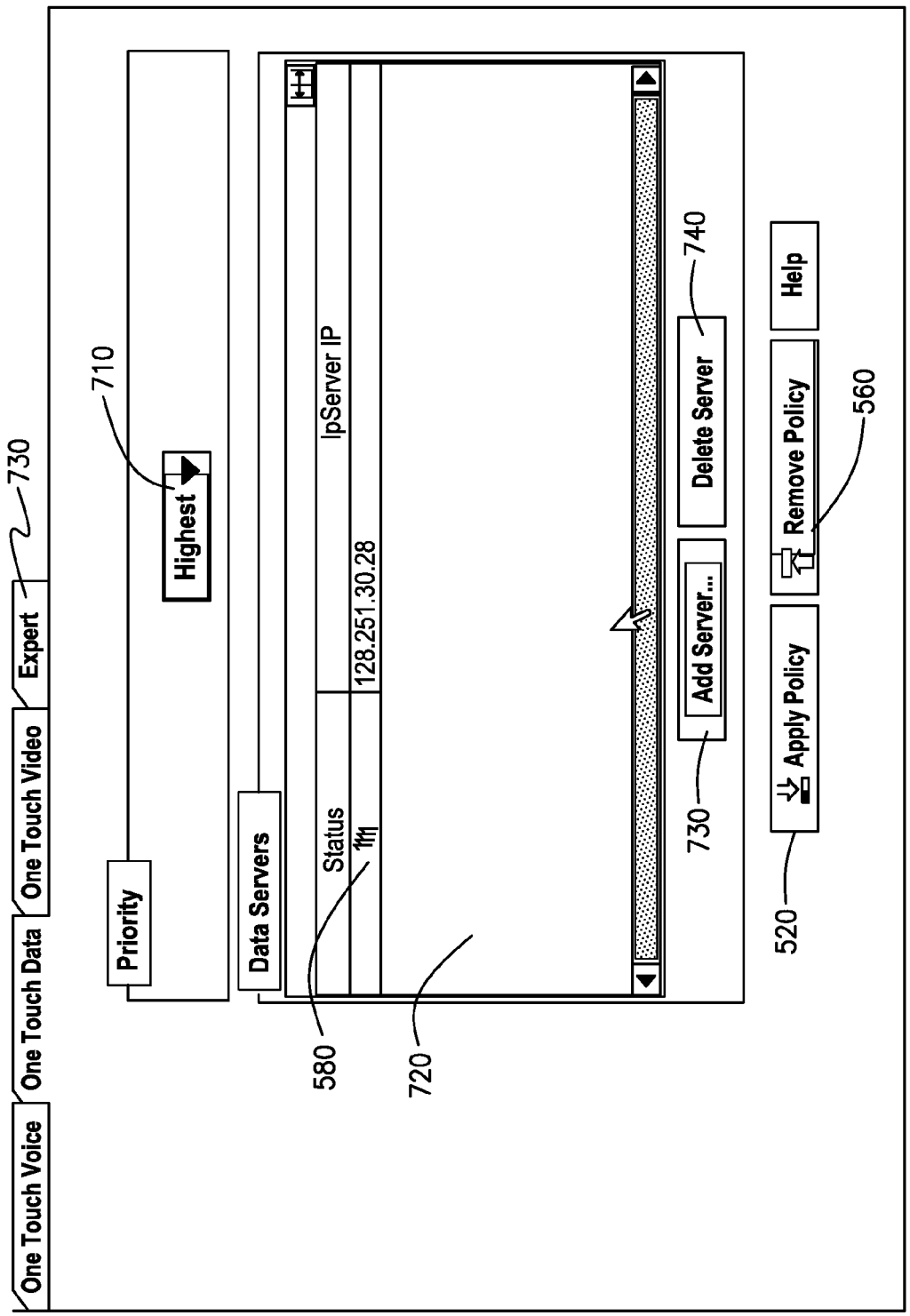
FIG. 7C is an example graphic user interface for network data device set up of the present invention.

At the bottom of the voice set up display 500 and the data set up display 700 there is an "Expert Mode" button 530 that, when selected, allows the user to access the guiding processing for creating and editing policies. FIG. 7C illustrates that this advancing to the Expert Mode can also be effected by tab selection 730.

Figure 7D:
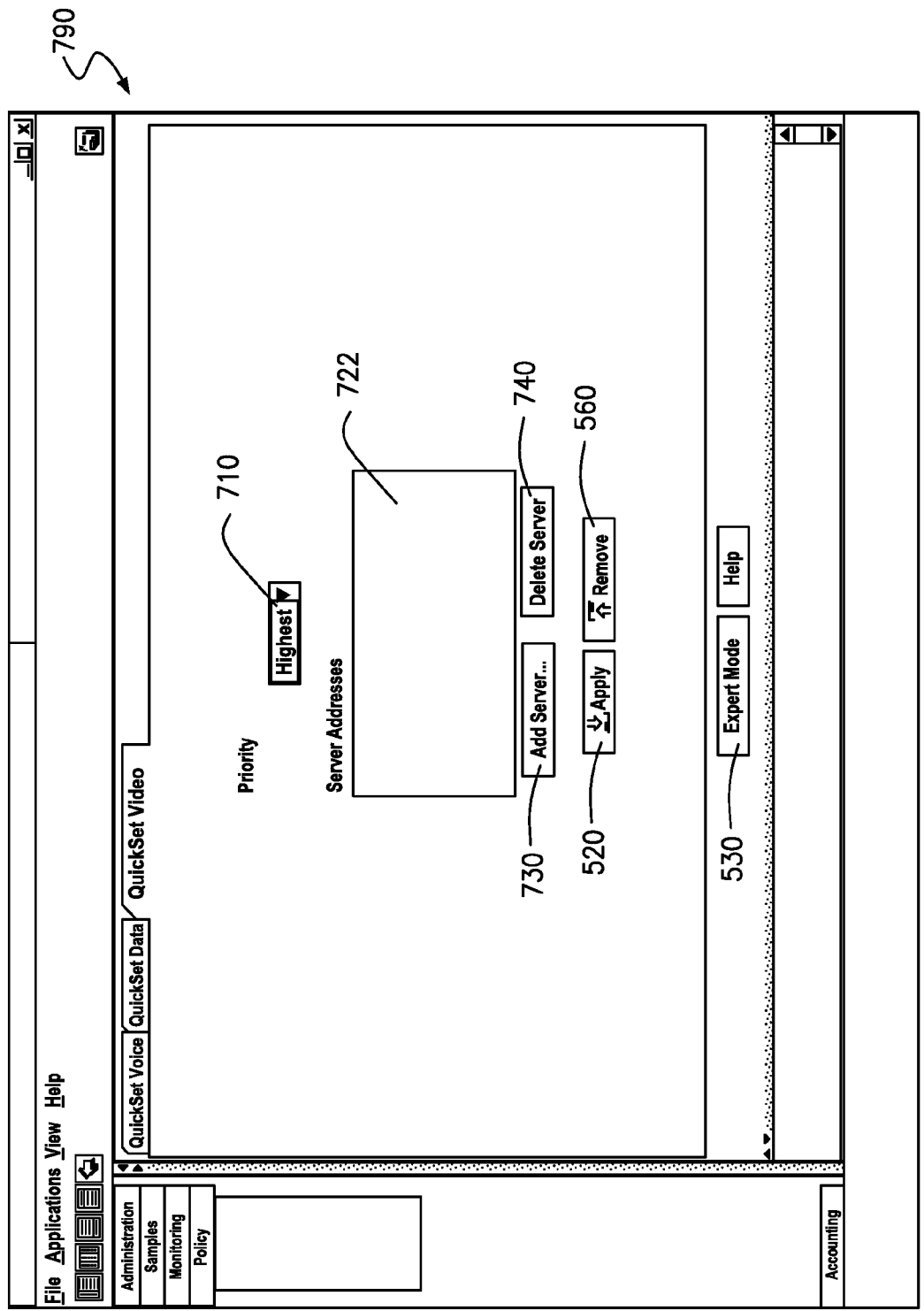
FIG. 7D is an example graphic user interface for network video device set up of the present invention.
Figure 7E:
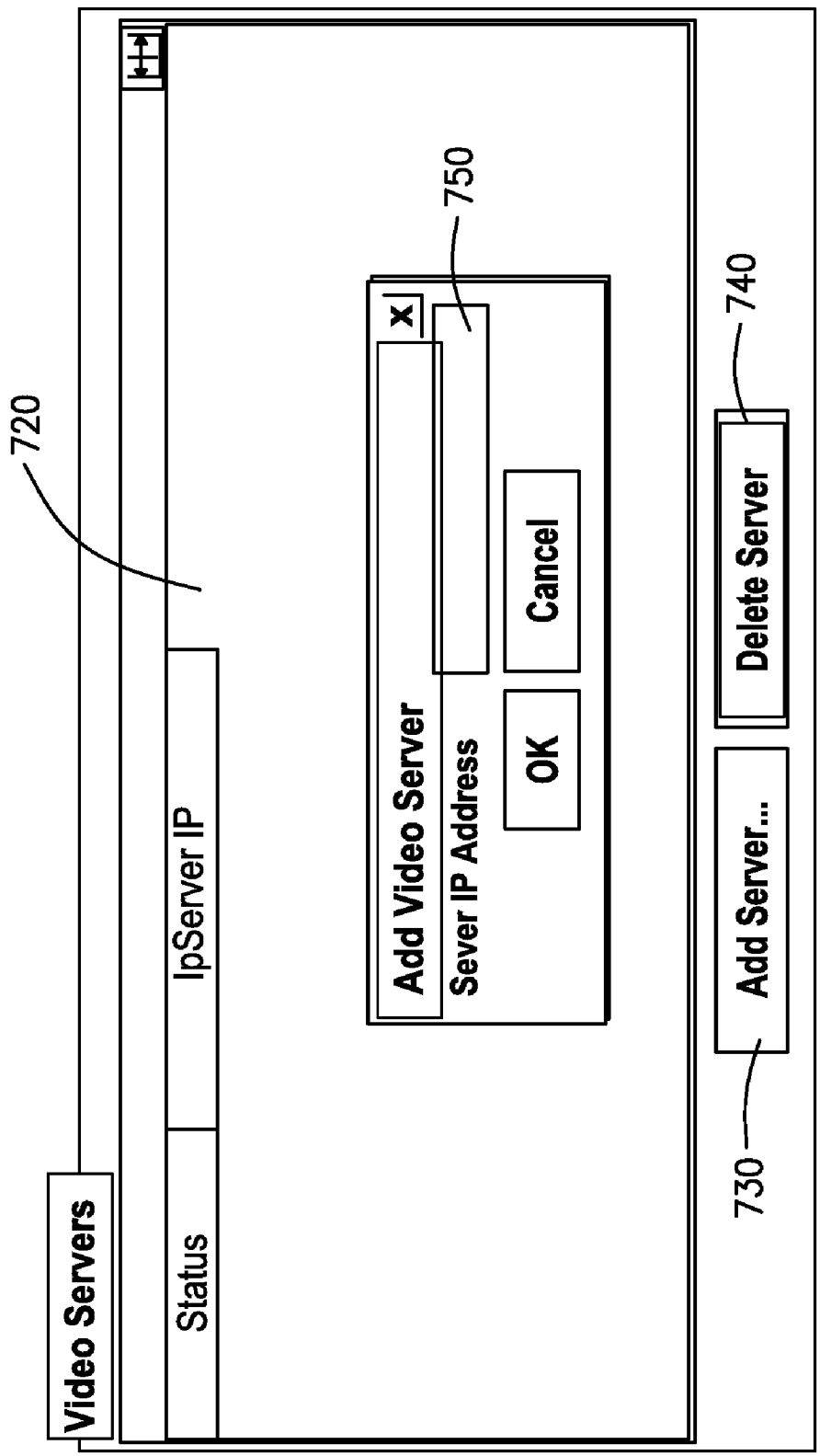
FIG. 7E is an example graphic user interface for network video device set up of the present invention.
Figure 7F:
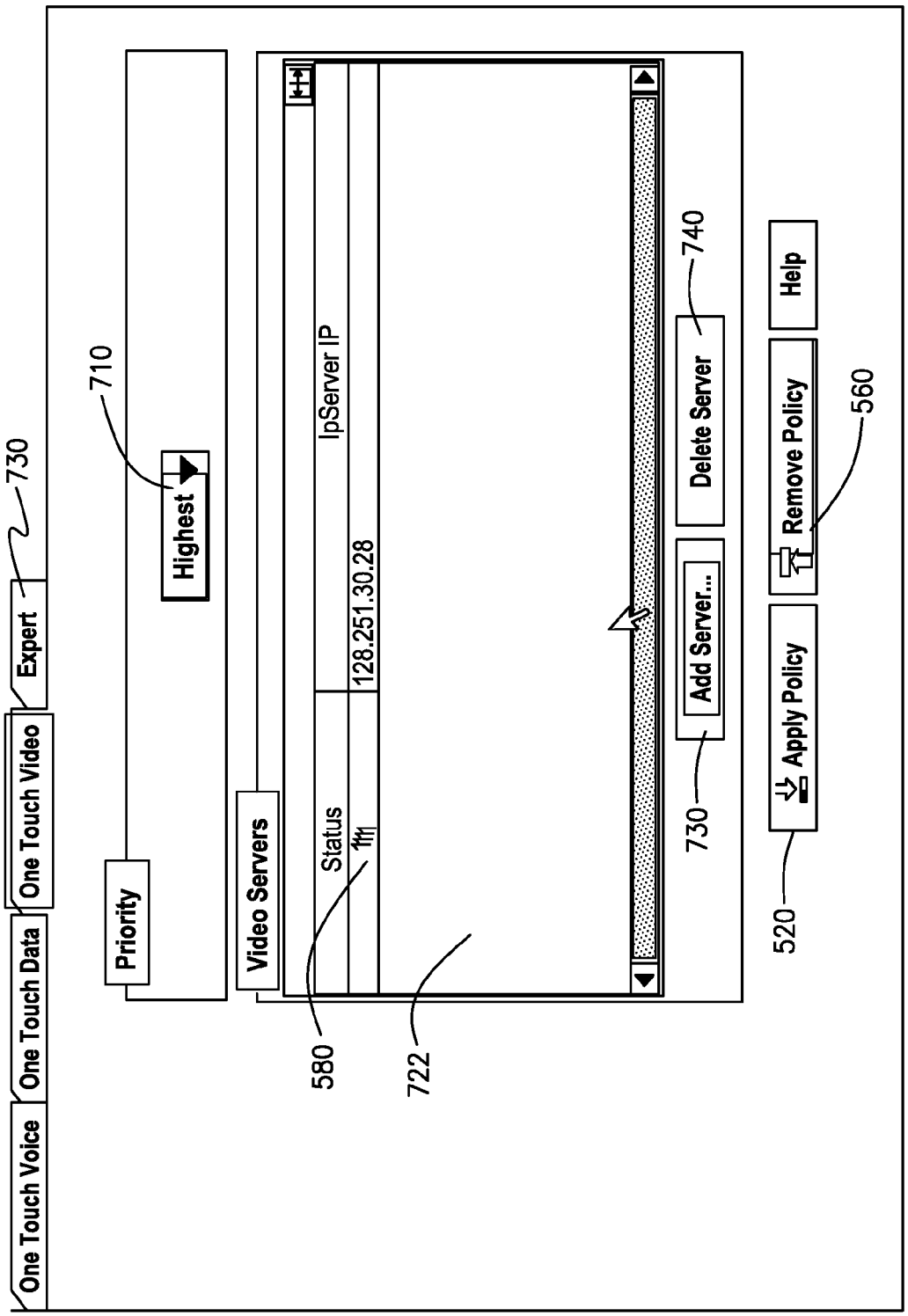
FIG. 7F is an example graphic user interface for network video device set up of the present invention.

FIGS. 7D, 7E and 7F illustrate that the video, including multimedia, set up display 790 (FIG. 7D) and process are substantially similar to the data set up display 700. Within the display of video server addresses 722, FIG. 7E, illustrates that the user may add a video server 750. FIG. 7F illustrates the video servers with a status icon 580.

Figure 8:
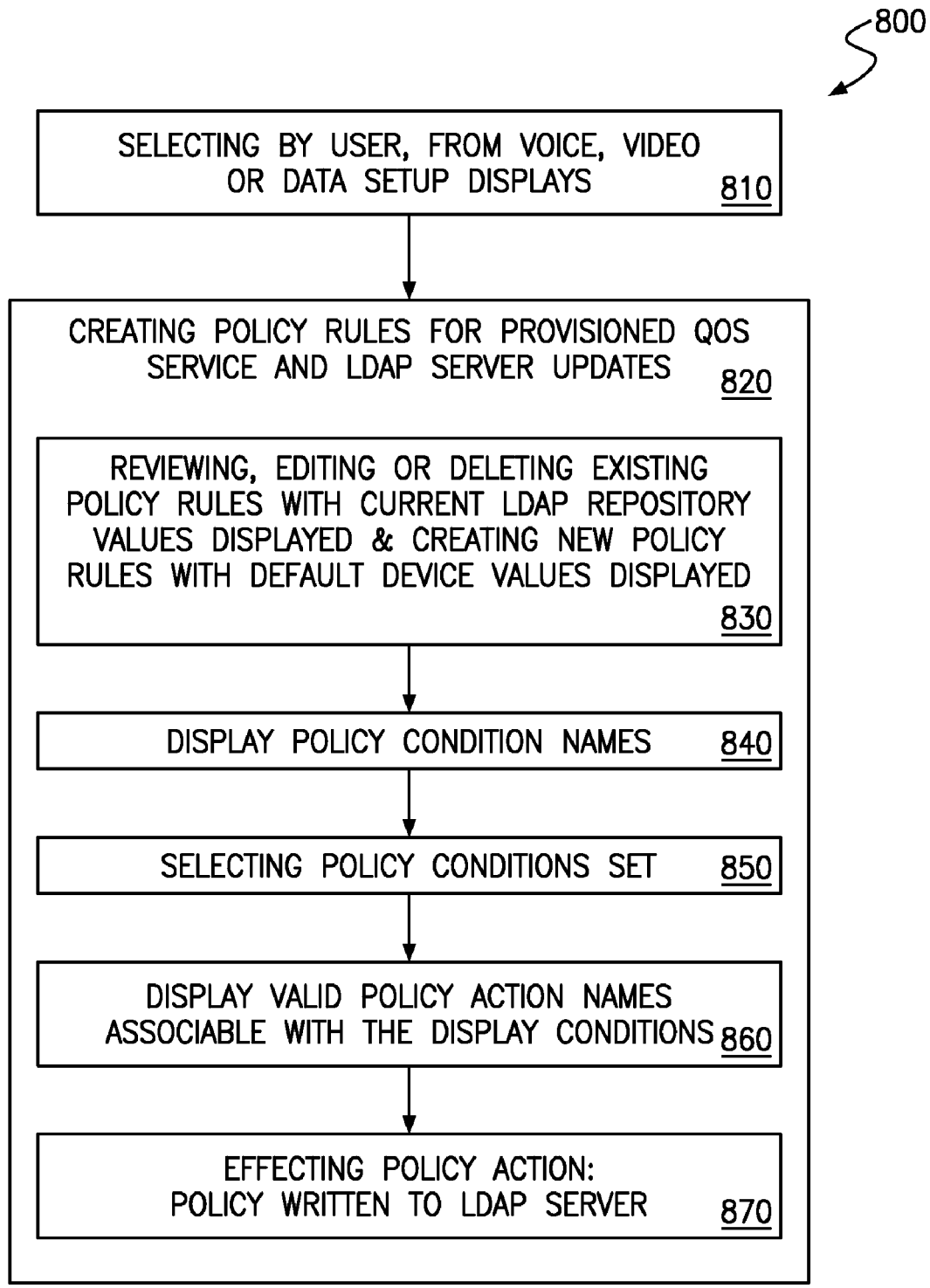
FIG. 8 is a process flowchart for policy rule creation and modification for embodiments of the present invention.

FIG. 8 illustrates that Selecting Expert Mode starts a guiding process 800 that guides the user through policy rule creation for provisioned QoS service with policy conditions and actions set by the user 820.

Figure 9:
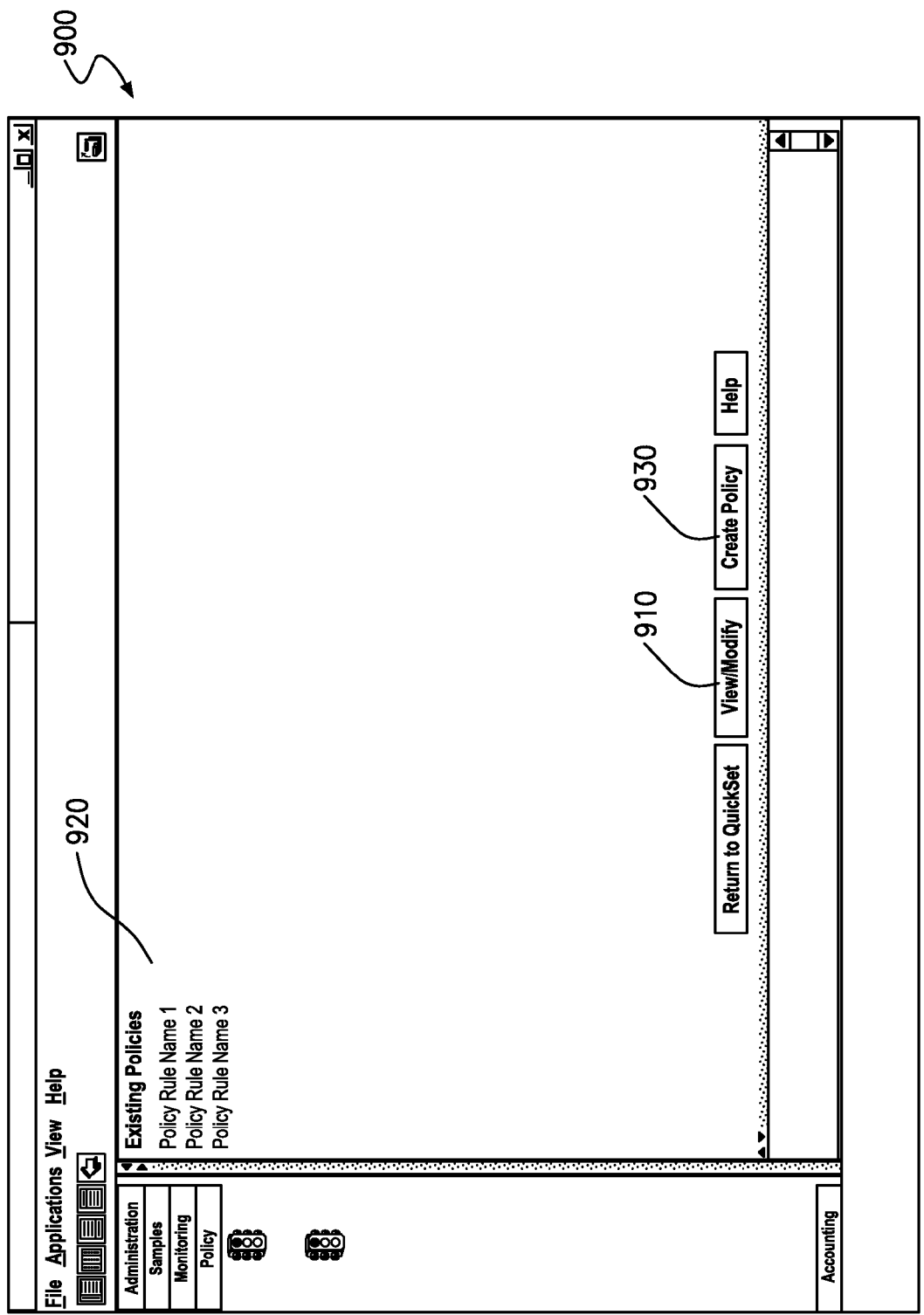
FIG. 9 is example graphic user interface for policy rule review of the present invention.

The guiding process 800 begins with the policy rule creation or selection for editing process 820. The graphic user interface provides an interactive means for reviewing, editing or deleting existing policy rules having current LDPA repository values and for creating new policy rules with default device values displayed 830. Thereafter, policy condition names are displayed 840. The guiding process then requires selection of the condition set 850 for display. The guiding processing then displays valid policy action names associable with the displayed conditions 860. The guiding processing prompts the user to make a selection of the action set for provisioned QoS and finishes by prompting the user to select the discovered devices against which the Policy Rule should be applied 870.

Where both Source IP and Destination IP definition is desired, two rules are required as the condition set. For example, if the logical operator AND is applied to both Source IP and Destination IP, then QoS is applied only if the traffic is both from the Source and to the Destination The graphic user interface of the guiding processing begins by bringing up a list of existing policies as shown in FIG. 9 and allows the user to view and/or edit 910 existing policies 920, to create a new policy, or delete an existing one 830. If the user chooses to create a policy 930, interface screens will be displayed to the user with their input components reflecting the device default values; if the policy is being edited, the components will be displayed with their current LDAP repository values. In the event the LDAP repository server is not on-line at the time of creation and or editing, then the policy processing initiates a restart of the LDAP repository service.

Generally, the QoS order of precedence is determined by the device according to the level of QoS priority (e.g., 1-4, or 0-6). However, when a policy is created, all other determining factors being equal, the QoS order of precedence (e.g., 0-65535) determines the order of evaluation by the device. The QoS precedence numbering of rules created by policy process is set by the policy processing via a QoS MIB variable and is transparent to the user. The user will be allowed to move an entry in the Existing Policies table 920 up or down within the list. When this happens, the policy processing will reset the precedence of the affected policies and they will be rewritten to the LDAP server.

Figure 10:
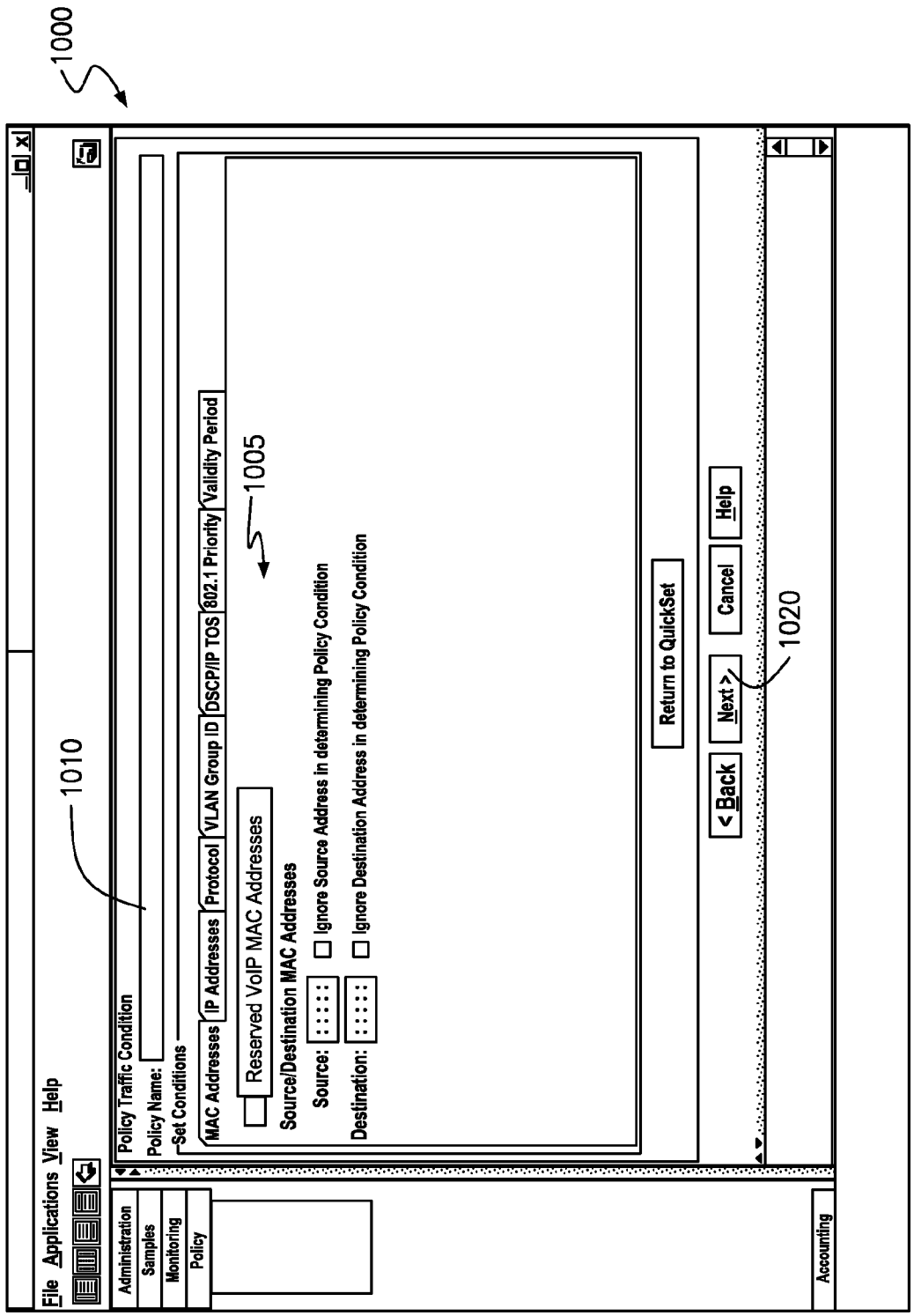
FIG. 10 is an example graphic user interface for setting policy conditions, particularly media access control (MAC) addresses, of the present invention.

After the user has chosen whether the policy is to be created or edited, the graphic user interface of the guiding processing displays a screen, illustrated in FIG. 10, where the policy condition set must be defined 1000 and in particular for this display screen, information pertaining to the MAC addresses 1005. If the policy is being created, the user is required to enter a name for the new policy 1010. Otherwise, the policy is being edited and the name will not be concurrently editable. If the policy must be renamed, the policy must be deleted and recreated, since the name field is the key for the data repository. The tab selections 1020 represent the features for setting policy conditions that are valid for provisioned QoS. Only those conditions that are valid for the selected feature and any conditions that are currently in effect are presented. When the user selects the targets for the Policy, if a target is selected that cannot support the policy, then an error message will be displayed to the user and processing will continue.

Figure 11:
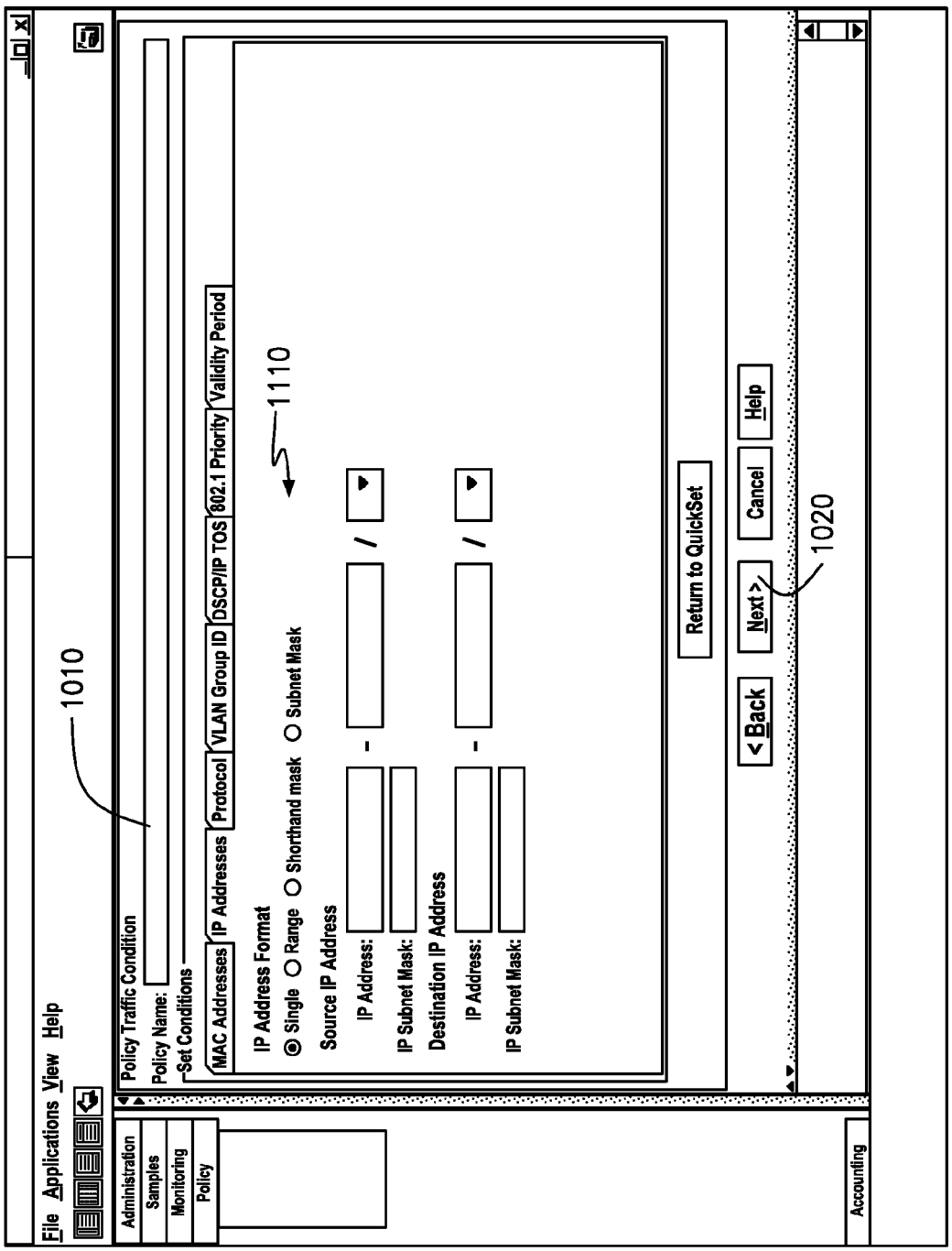
FIG. 11 is an example graphic user interface for setting policy conditions, particularly IP addresses, of the present invention.
Figure 12:
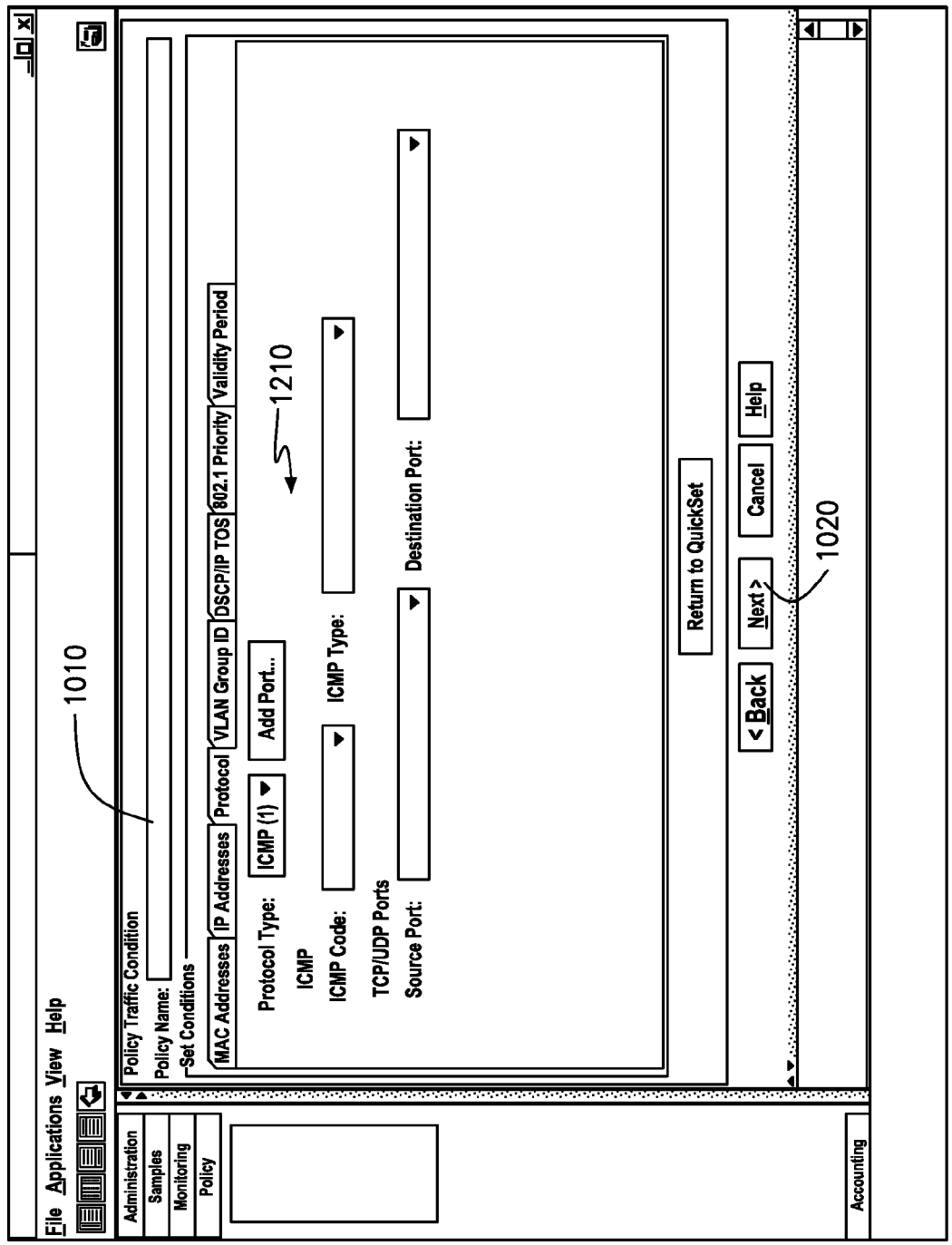
FIG. 12 is an example graphic user interface for setting policy conditions, particularly protocol settings, of the present invention.
Figure 13:
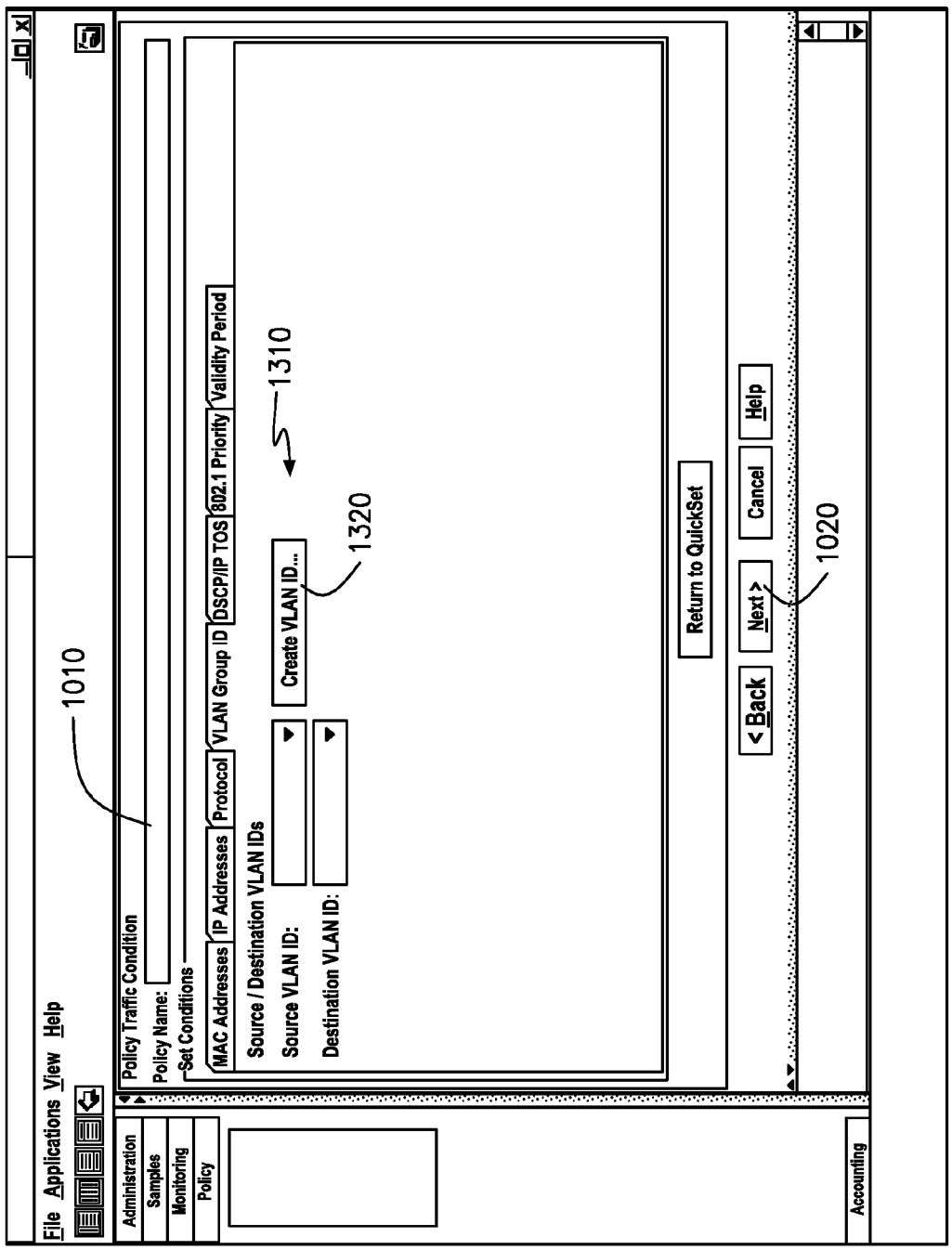
FIG. 13 is an example graphic user interface for setting policy conditions, particularly virtual local area network identification, of the present invention.
Figure 14:
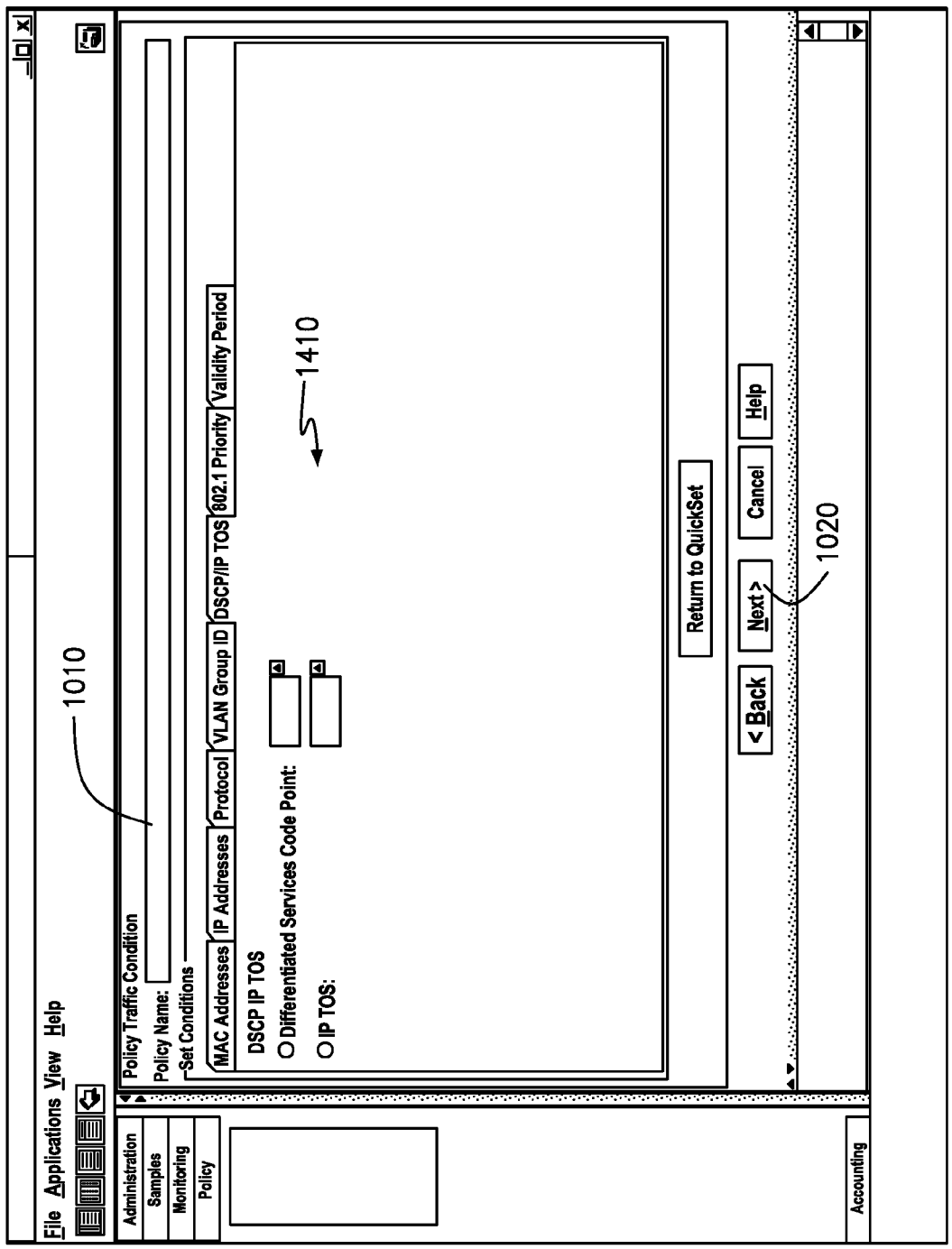
FIG. 14 is an example graphic user interface for setting policy conditions, particularly differentiated Services code point selection and IP type of service (TOS) selection, of the present invention.
Figure 15:
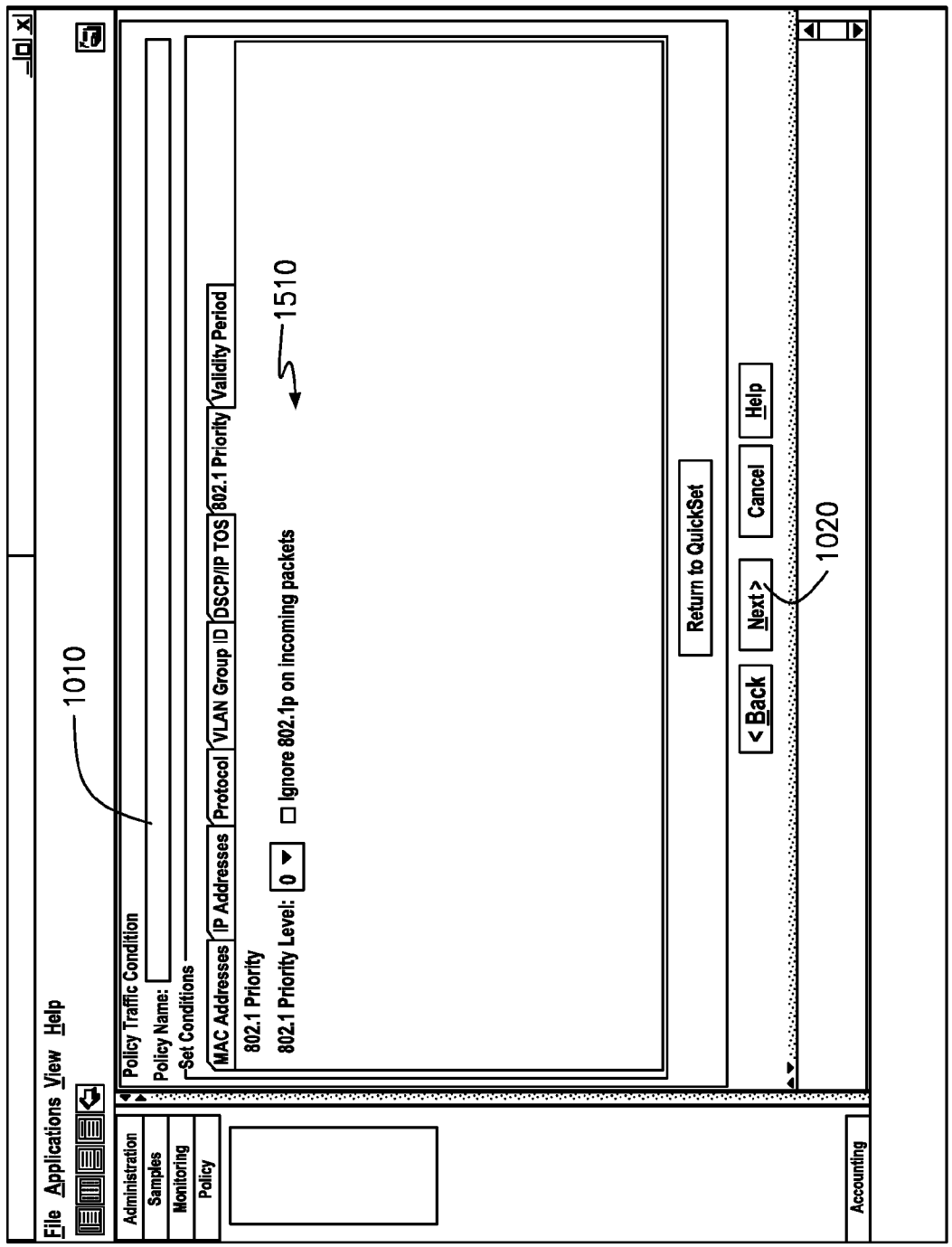
FIG. 15 is an example graphic user interface for setting policy conditions, particularly relating to IEEE standard 802.1 priority, of the present invention.
Figure 16:
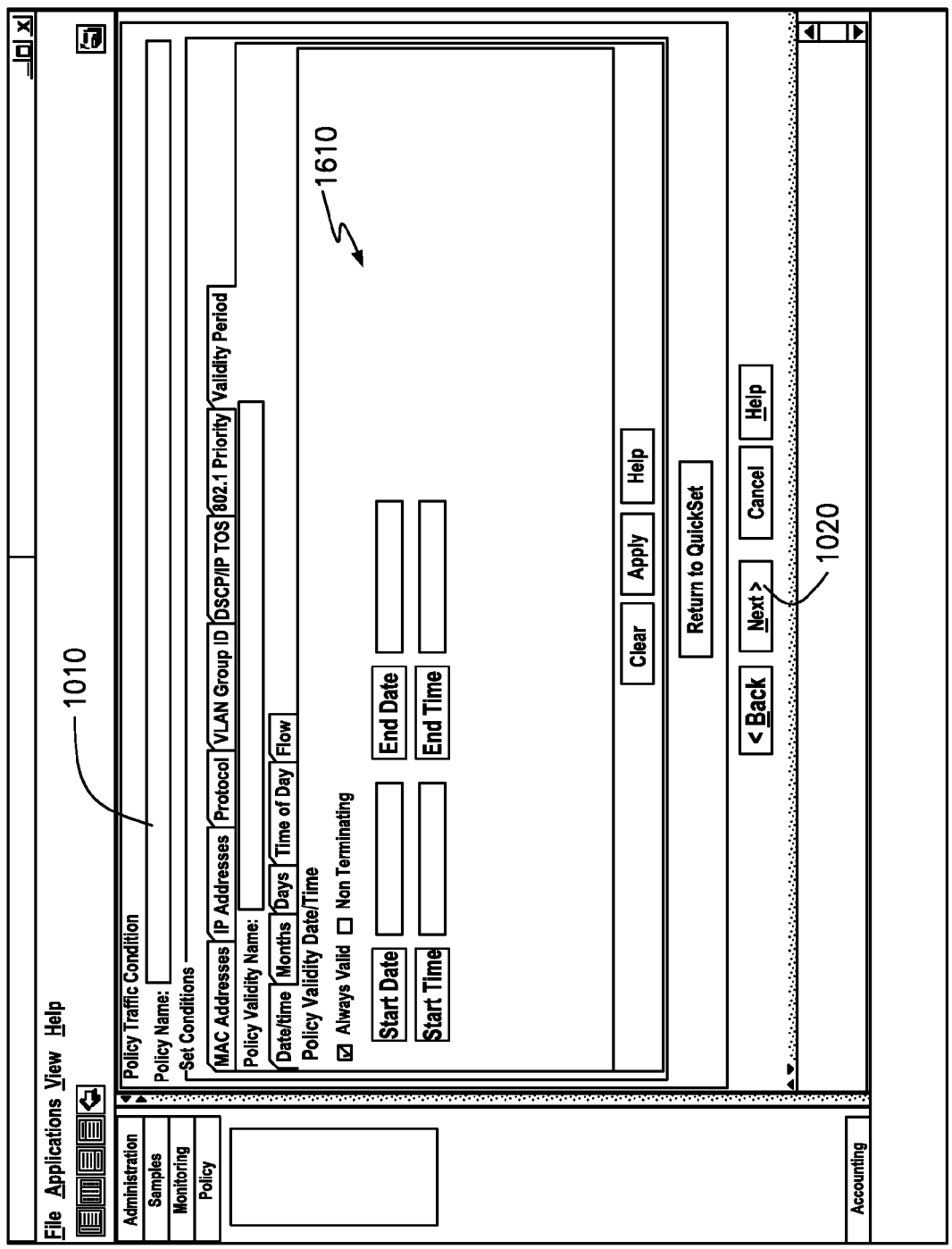
FIG. 16 is an example graphic user interface for setting policy conditions, particularly relating to the validity period, of the present invention.
Figure 17:
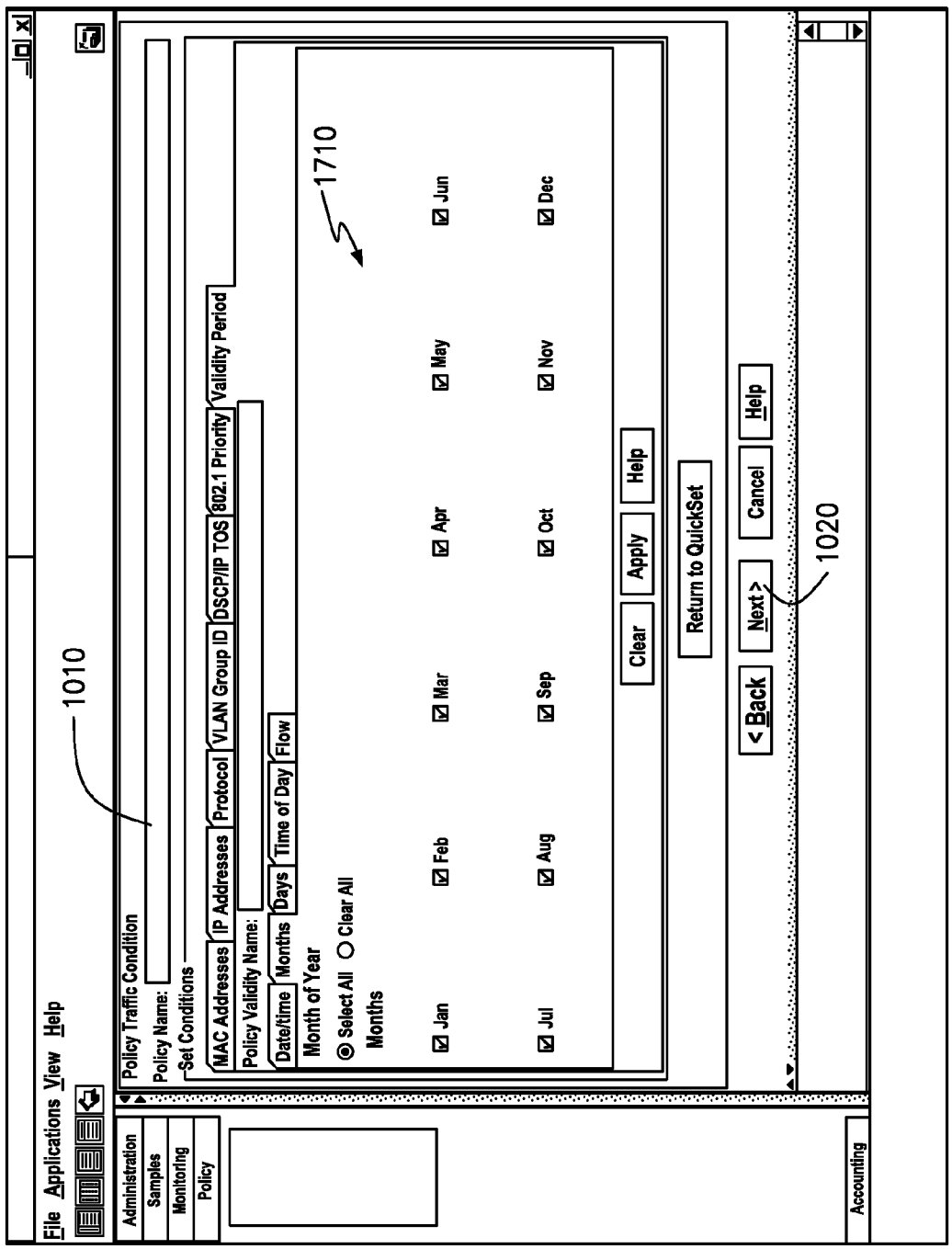
FIG. 17 is an example graphic user interface for setting policy conditions, particularly relating to the validity period by months, of the present invention.
Figure 18:
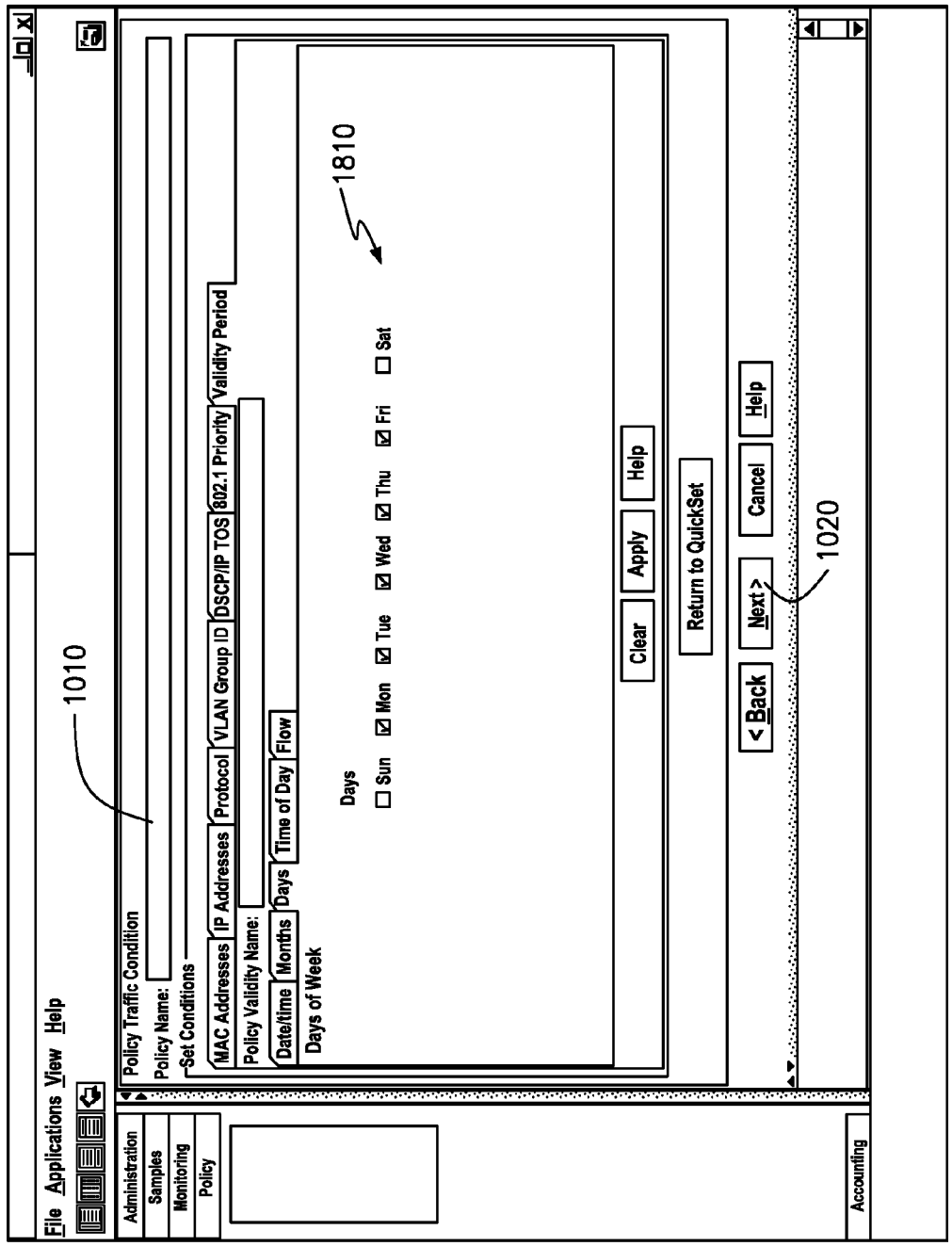
FIG. 18 is an example graphic user interface for setting policy conditions, particularly relating to the validity period by days of the week, of the present invention.
Figure 19:
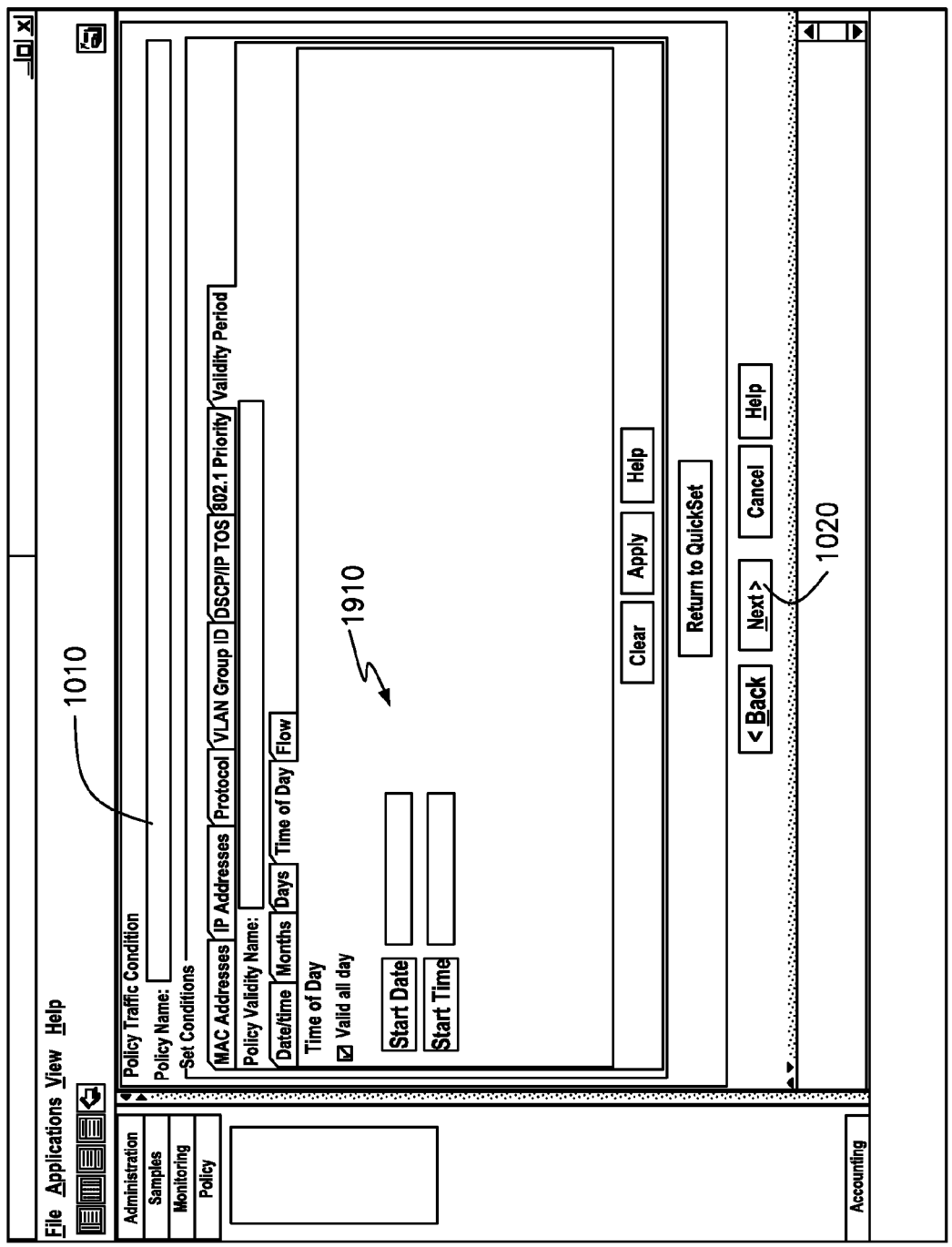
FIG. 19 is an example graphic user interface for setting policy conditions, particularly relating to the validity period by time of day, of the present invention.

FIGS. 11 through 19 depict the condition displays that will be presented when the various condition tabs 1020 are selected. These displays are capable of being enhanced to include the addition of checkboxes that must be selected in order for the corresponding GUI component to be used in policy rule, condition and action definition. FIG. 11 illustrates the policy condition for IP addresses 1110. FIG. 12 illustrates the policy condition for protocol 1210. FIG. 13 illustrates policy condition for VLAN Group ID 1310. The "Create VLAN ID . . . " button 1320 is removable from this screen in particular embodiments. FIG. 14 illustrates the policy condition for DSCP/IP TOS 1410. FIG. 15 illustrates the policy condition 802.1 priority 1510. FIG. 16 illustrates the policy condition for the validity period date and/or time 1610. FIG. 17 illustrates the policy condition for the validity period months 1710. FIG. 18 illustrates the policy for the validity period days 1810. FIG. 19 illustrates the policy for the validity period time of day 1910. Each policy rule condition display of the guiding processing graphic user interface contains a "Next >" button 1020 that will cause the valid actions that can be associated with the condition(s) to be displayed. Together, the conditions and actions define policy rules.

Figure 20:
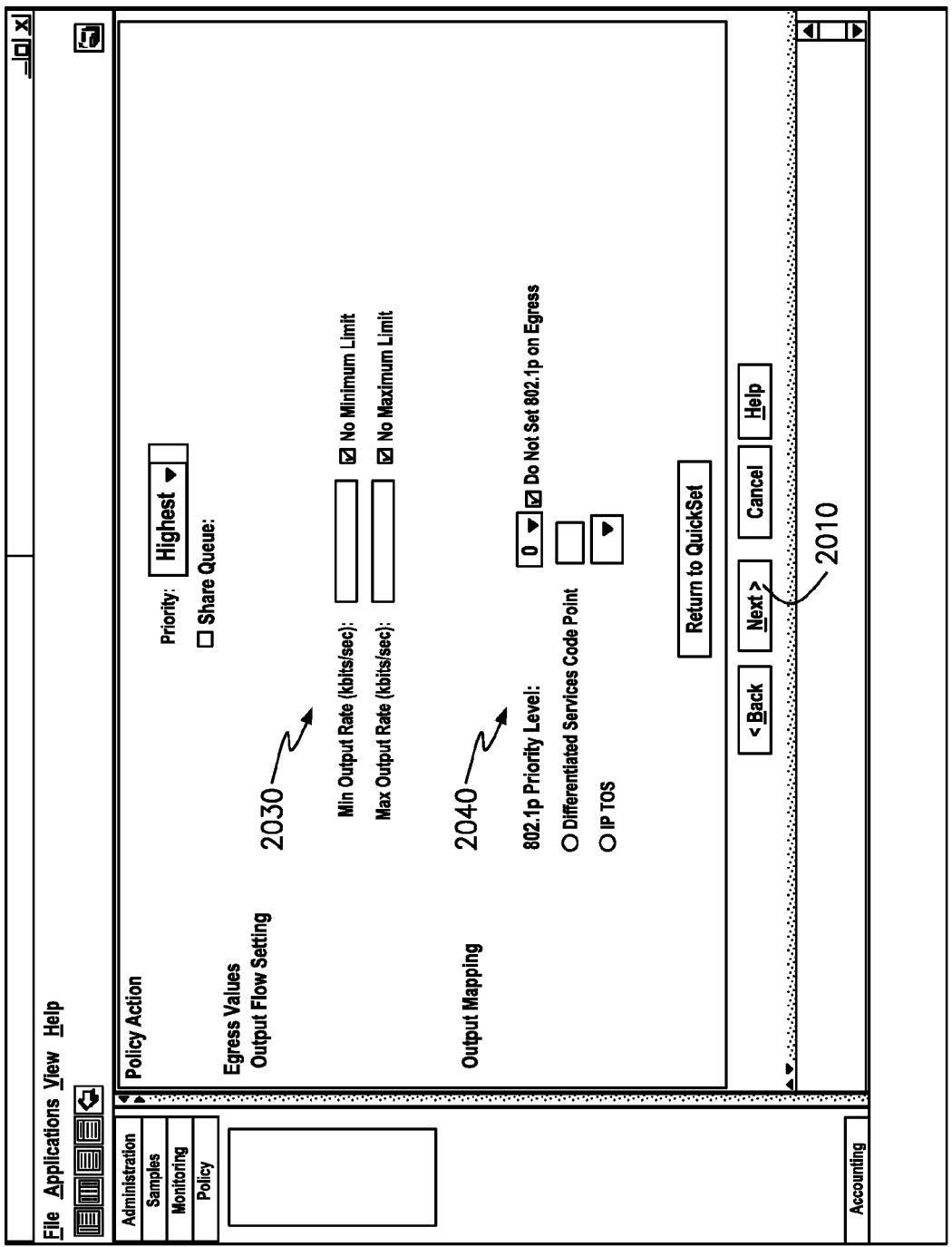
FIG. 20 is an example graphic user interface for setting policy actions, particularly provisioning quality of service priority, of the present invention.
Figure 21:
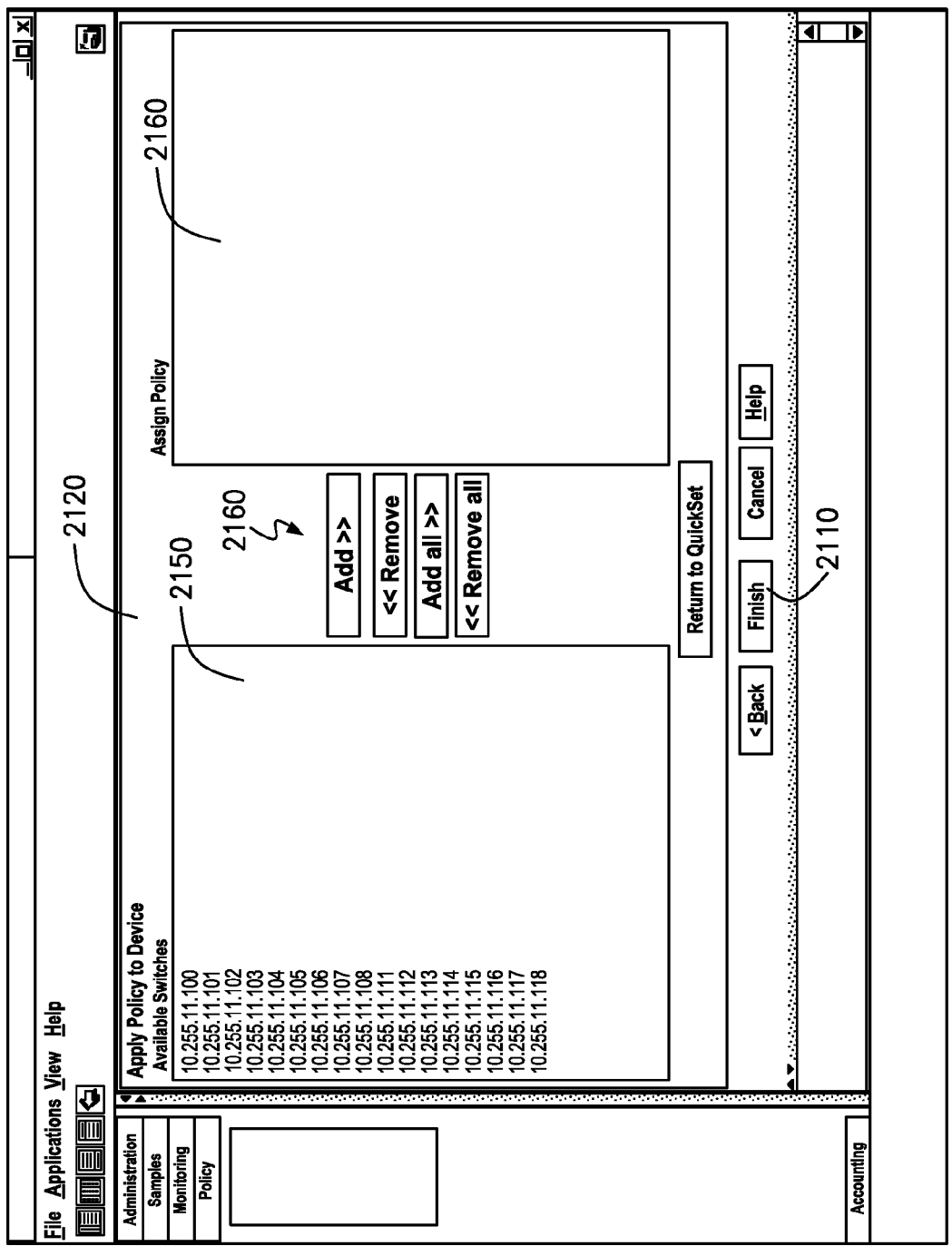
FIG. 21 is an example graphic user interface for applying policies to devices, of the present invention.

An example of the provisioned QoS action screen is depicted in FIG. 20. With respect to egress values, the output flow setting 2030 and the output mapping 2040 are displayed. Each action screen associated with a feature condition set contains a "Next >" button 2010, which the user selects to take guiding processing to the screen which allows the user to apply the policy to a set of devices. In the several embodiments of the present invention, it is not necessary that the administrator with screen select the devices to which the policy will be applied because the policy is written to the LDAP server without administrator designation. However, FIG. 21, depicts the screed where, should the user seek to apply the policy immediately to one or more devices, the guiding processing presents a table 2150, of discovered devices within the graphic user interface from which the user chooses against which the policy will apply and be displayed in a second table 2160. The user uses one or more selector buttons 2170 after highlighting, if needed, one or more particular devices.

Figure 22:
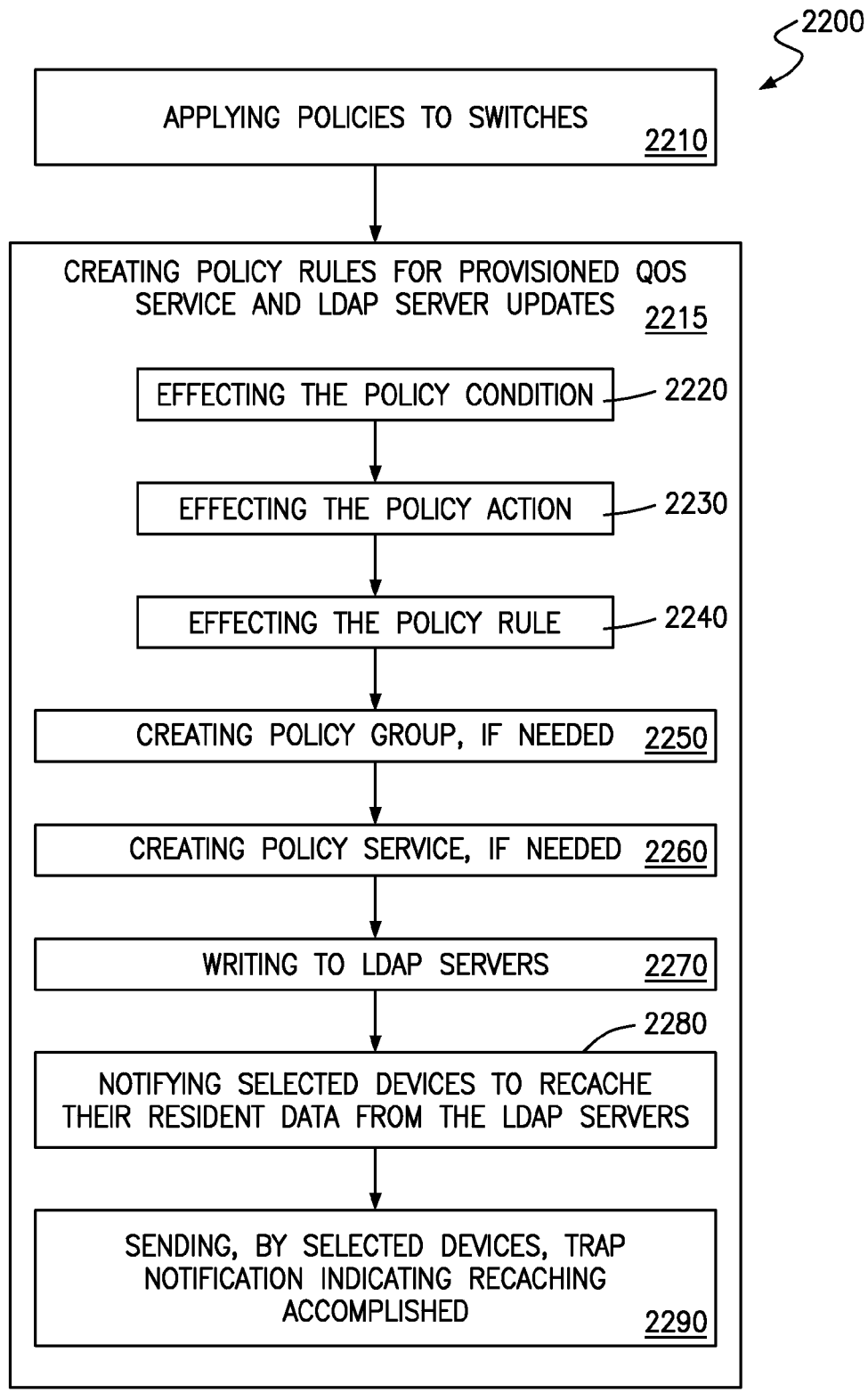
FIG. 22 is a process flowchart for applying policy rules to network devices for embodiments of the present invention.

When the user selects the "Finish" button 2110 from the "Apply Policy To Devices" screen 2120, the following processing, as illustrated in FIG. 22, takes place: (a) the policy condition is created/edited 2220; (b) the policy action is created/edited 2230; (c) the policy rule is created/edited 2240; (d) in the case of create, a policy group is created 2250; (e) in the case of create, a policy service is created 2260; (f) the policy is written to the LDAP server 2270 and the icons on the list turns yellow; (g) if devices are selected, the selected devices are notified to re-cache their resident data from the LDAP servers 2280 and the icons on the list turns red; and (h) if devices are selected, each selected device sends trap notification to the policy processing to indicate they have re-cached their device-resident data from the LDAP data repository 2290 where the icons on the list turns gray if they do not support the policy and green if they do. For example, for those policy entries required by the LDAP schema, but transparent to the user, the following entries are made:

Policy Rule Name:
    <User-selected policy rule name>Rule;
Policy Condition Name:
    <User-selected policy rule name>Condition;
Policy Condition Set:
    <User-selected condition set>;
Policy Action Name:
    <User-selected policy rule name>Action; and Policy Action:
    <User-selected action set>.

If the user wishes to establish an order of precedence for this policy, other than the default precedence, the initial guiding processing graphic user interface screen depicted in FIG. 9 is used.

An appropriate error message will be displayed once the "Apply" or "Finish" button 2110 is selected, if the LDAP server cannot be updated, or if there is an error in notifying the selected devices that they should re-cache their LDAP repository data or if there is an error in the devices notifying the policy processing of their updates status.

Many alterations and modifications may be made by those having ordinary skill in the art without departing from the spirit and scope of the invention and its several embodiments disclosed herein. Therefore, it must be understood that the illustrated embodiments have been set forth only for the purposes of example and that it should not be taken as limiting the invention as defined by the following claims. For example, the services disclosed may be performed by processing hosted on one or several network devices such as servers.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements. For example, the identifying colors for the icons may different that those disclosed and still achieve the function of status-by-color.

The claims are thus to be understood to include what is specifically illustrated and described above, what is conceptually equivalent, what can be obviously substituted and also what essentially incorporates the essential idea of the invention.

We claim:

1. A system comprising:
   a user interface coupled to a processor and associated memory operable as a graphic user interface configured to allow a user to set up quality of service (QoS) provisioning for at least a plurality of voice-over Internet Protocol (VOIP) devices, and to display one or more selected IP phone subnets, that include voice-supported subnets, an indication of a current QoS policy for each displayed subnet and an indicator to apply a new QoS policy to each displayed subnet; and
   a network policy server, accessed by the user, comprising a processor and associated memory operable for provisioning QoS related policies for the plurality of voice over Internet Protocol (VOIP) devices during set up.

* * * * *